United States Patent
Imamura et al.

(10) Patent No.: US 10,583,629 B2
(45) Date of Patent: Mar. 10, 2020

(54) JOINING STRUCTURE

(71) Applicant: Kobe Steel, Ltd., Kobe-shi (JP)

(72) Inventors: Yoshihaya Imamura, Fujisawa (JP);
Chieko Imai, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 48 days.

(21) Appl. No.: 15/546,542

(22) PCT Filed: Jan. 14, 2016

(86) PCT No.: PCT/JP2016/050962
§ 371 (c)(1),
(2) Date: Jul. 26, 2017

(87) PCT Pub. No.: WO2016/125552
PCT Pub. Date: Aug. 11, 2016

(65) Prior Publication Data
US 2018/0001525 A1   Jan. 4, 2018

(30) Foreign Application Priority Data

Feb. 6, 2015   (JP) ................................. 2015-022474
Feb. 6, 2015   (JP) ................................. 2015-022475
Oct. 19, 2015  (JP) ................................. 2015-205912

(51) Int. Cl.
*B29C 45/14* (2006.01)
*B29C 65/00* (2006.01)
(Continued)

(52) U.S. Cl.
CPC ................. *B32B 7/04* (2013.01); *B21J 15/02* (2013.01); *B23K 11/11* (2013.01); *B23K 11/14* (2013.01);
(Continued)

(58) Field of Classification Search
None
See application file for complete search history.

(56) References Cited

U.S. PATENT DOCUMENTS 3,448,550 A * 6/1969 Herr ........................ B60R 13/04
                                                           52/98
3,451,853 A * 6/1969 Spahrbier .............. B22D 19/00
                                                          429/469

(Continued)

FOREIGN PATENT DOCUMENTS

CN          1663729 A   *  9/2005  .............. B21J 15/10
CN       201087750 Y   *  7/2008  ........... B62D 25/082
(Continued)

OTHER PUBLICATIONS

Machine Translation of JP 2005001615 A, Jan. 2005 (Year: 2005).*
(Continued)

*Primary Examiner* — Jeffrey A Vonch
(74) *Attorney, Agent, or Firm* — Oblon, McClelland, Maier & Neustadt, L.L.P.

(57) ABSTRACT

A joining structure includes a first member, a second member of a material different from that of the first member, and a separation mechanism provided between the first member and the second member and that separates the first member and the second member from each other, wherein a resin is filled into the space between the edge of at least one member among the first member and the second member, and the other member.

18 Claims, 24 Drawing Sheets

(51) Int. Cl.
| | | |
|---|---|---|
| B29C 65/70 | (2006.01) | |
| B29C 65/72 | (2006.01) | |
| B29C 65/78 | (2006.01) | |
| B32B 1/04 | (2006.01) | |
| B32B 1/06 | (2006.01) | |
| B32B 1/08 | (2006.01) | |
| B32B 7/025 | (2019.01) | |
| B32B 7/04 | (2019.01) | |
| B32B 15/08 | (2006.01) | |
| B21J 15/02 | (2006.01) | |
| B23K 11/11 | (2006.01) | |
| B23K 11/14 | (2006.01) | |
| B23K 11/16 | (2006.01) | |
| B23K 11/20 | (2006.01) | |
| B62D 27/02 | (2006.01) | |
| B62D 29/00 | (2006.01) | |
| B29C 65/60 | (2006.01) | |
| B32B 3/28 | (2006.01) | |
| B32B 7/08 | (2019.01) | |
| B32B 7/12 | (2006.01) | |
| B62D 29/04 | (2006.01) | |
| B29C 65/64 | (2006.01) | |
| B32B 3/30 | (2006.01) | |
| B32B 15/18 | (2006.01) | |
| B32B 3/02 | (2006.01) | |
| B32B 15/04 | (2006.01) | |
| B32B 3/26 | (2006.01) | |
| B32B 15/20 | (2006.01) | |
| B32B 15/14 | (2006.01) | |
| B23K 103/20 | (2006.01) | |
| B23K 103/18 | (2006.01) | |
| B23K 101/04 | (2006.01) | |
| F16B 5/08 | (2006.01) | |
| B23K 101/00 | (2006.01) | |
| B23K 101/06 | (2006.01) | |
| B23K 101/08 | (2006.01) | |
| B29K 705/02 | (2006.01) | |
| B29K 705/00 | (2006.01) | |
| B29L 9/00 | (2006.01) | |
| B29L 31/00 | (2006.01) | |
| B29K 101/00 | (2006.01) | |
| B29L 31/30 | (2006.01) | |
| B29K 705/12 | (2006.01) | |
| B29L 23/00 | (2006.01) | |

(52) U.S. Cl.
CPC .......... *B23K 11/16* (2013.01); *B23K 11/20* (2013.01); *B29C 45/14* (2013.01); *B29C 45/14065* (2013.01); *B29C 45/14336* (2013.01); *B29C 45/14377* (2013.01); *B29C 45/14467* (2013.01); *B29C 45/14475* (2013.01); *B29C 45/14491* (2013.01); *B29C 45/14614* (2013.01); *B29C 45/14631* (2013.01); *B29C 45/14639* (2013.01); *B29C 65/60* (2013.01); *B29C 65/601* (2013.01); *B29C 65/70* (2013.01); *B29C 65/72* (2013.01); *B29C 65/782* (2013.01); *B29C 65/7823* (2013.01); *B29C 66/51* (2013.01); *B29C 66/5227* (2013.01); *B29C 66/5326* (2013.01); *B29C 66/7314* (2013.01); *B32B 1/08* (2013.01); *B32B 3/28* (2013.01); *B32B 7/025* (2019.01); *B32B 7/08* (2013.01); *B32B 7/12* (2013.01); *B32B 15/08* (2013.01); *B62D 27/02* (2013.01); *B62D 27/023* (2013.01); *B62D 29/001* (2013.01); *B62D 29/004* (2013.01); *B62D 29/048* (2013.01); *B23K 2101/006* (2018.08); *B23K 2101/04* (2018.08); *B23K 2101/045* (2018.08); *B23K 2101/06* (2018.08); *B23K 2101/08* (2018.08); *B23K 2103/18* (2018.08); *B23K 2103/20* (2018.08); *B29C 45/14344* (2013.01); *B29C 45/14409* (2013.01); *B29C 45/14508* (2013.01); *B29C 45/14598* (2013.01); *B29C 65/64* (2013.01); *B29C 65/7826* (2013.01); *B29C 65/7829* (2013.01); *B29C 66/112* (2013.01); *B29C 66/1122* (2013.01); *B29C 66/131* (2013.01); *B29C 66/137* (2013.01); *B29C 66/1312* (2013.01); *B29C 66/301* (2013.01); *B29C 66/304* (2013.01); *B29C 66/4326* (2013.01); *B29C 66/742* (2013.01); *B29C 66/74283* (2013.01); *B29C 2045/1436* (2013.01); *B29C 2045/14327* (2013.01); *B29C 2045/14483* (2013.01); *B29C 2045/14524* (2013.01); *B29C 2045/14532* (2013.01); *B29K 2101/00* (2013.01); *B29K 2705/00* (2013.01); *B29K 2705/02* (2013.01); *B29K 2705/12* (2013.01); *B29L 2009/003* (2013.01); *B29L 2023/00* (2013.01); *B29L 2031/001* (2013.01); *B29L 2031/3002* (2013.01); *B29L 2031/3055* (2013.01); *B32B 1/04* (2013.01); *B32B 1/06* (2013.01); *B32B 3/02* (2013.01); *B32B 3/266* (2013.01); *B32B 3/30* (2013.01); *B32B 15/043* (2013.01); *B32B 15/14* (2013.01); *B32B 15/18* (2013.01); *B32B 15/20* (2013.01); *B32B 2307/20* (2013.01); *B32B 2307/752* (2013.01); *B32B 2311/00* (2013.01); *B32B 2311/24* (2013.01); *B32B 2311/30* (2013.01); *B32B 2398/00* (2013.01); *B32B 2597/00* (2013.01); *B32B 2605/00* (2013.01); *B32B 2605/08* (2013.01); *B62D 27/026* (2013.01); *B62D 29/005* (2013.01); *F16B 5/08* (2013.01); *Y10T 428/139* (2015.01); *Y10T 428/1355* (2015.01); *Y10T 428/1359* (2015.01); *Y10T 428/1393* (2015.01); *Y10T 428/2457* (2015.01); *Y10T 428/24182* (2015.01); *Y10T 428/24322* (2015.01); *Y10T 428/24347* (2015.01); *Y10T 428/24612* (2015.01); *Y10T 428/24661* (2015.01); *Y10T 428/24777* (2015.01)

(56) References Cited

U.S. PATENT DOCUMENTS

| | | | | |
|---|---|---|---|---|
| 3,470,598 | A * | 10/1969 | Berthelsen | B29C 65/2076 29/897.312 |
| 3,822,464 | A * | 7/1974 | Hester | B21D 39/06 428/355 AC |
| 4,115,974 | A * | 9/1978 | Purcell | B60C 23/18 296/1.08 |
| 4,598,008 | A * | 7/1986 | Vogt | B32B 3/12 428/117 |
| 4,727,232 | A * | 2/1988 | Omori | B62D 27/02 219/118 |
| 4,785,523 | A * | 11/1988 | Koseki | B23P 15/00 264/259 |
| 4,848,835 | A * | 7/1989 | DeRees | B62D 21/02 296/204 |
| 4,860,425 | A * | 8/1989 | Kunisaki | B23P 23/00 29/527.4 |
| 4,998,337 | A * | 3/1991 | Tiekink | B29C 45/14614 138/149 |
| 5,052,848 | A * | 10/1991 | Nakamura | B62K 19/22 280/281.1 |

(56) References Cited

U.S. PATENT DOCUMENTS

| | | | | |
|---|---|---|---|---|
| 5,190,803 A * | 3/1993 | Goldbach | B29C 37/0085 | 264/261 |
| 5,273,606 A * | 12/1993 | Greve | B62D 27/026 | 156/216 |
| 5,320,403 A * | 6/1994 | Kazyak | B62D 23/005 | 296/203.01 |
| 5,411,308 A * | 5/1995 | Kreis | B62D 21/02 | 296/30 |
| 5,421,781 A * | 6/1995 | Mackellar | B29C 66/5221 | 464/181 |
| 5,640,884 A * | 6/1997 | Fujiu | B29C 45/14491 | 280/777 |
| 5,715,643 A * | 2/1998 | Parkinson | B62D 23/005 | 52/656.9 |
| 5,830,308 A * | 11/1998 | Reichard | B29C 65/7855 | 156/291 |
| 5,884,960 A * | 3/1999 | Wycech | B29C 44/1228 | 296/146.6 |
| 5,915,781 A * | 6/1999 | DeRees | B29C 66/54 | 296/203.01 |
| 6,003,935 A * | 12/1999 | Kalazny | B62D 21/14 | 280/785 |
| 6,037,559 A * | 3/2000 | Okabe | B23K 11/115 | 219/91.23 |
| 6,083,604 A * | 7/2000 | Haraga | F16B 5/00 | 428/132 |
| 6,096,403 A * | 8/2000 | Wycech | B29C 44/1228 | 428/122 |
| 6,216,810 B1 * | 4/2001 | Nakai | B29C 37/0085 | 180/68.4 |
| 6,234,375 B1 * | 5/2001 | Durand | B23K 9/08 | 228/115 |
| 6,247,287 B1 * | 6/2001 | Takabatake | B29C 44/18 | 264/46.6 |
| 6,294,043 B1 * | 9/2001 | Greig | B62D 27/026 | 156/290 |
| 6,474,726 B1 * | 11/2002 | Hanakawa | B62D 25/04 | 296/187.12 |
| 6,503,585 B1 * | 1/2003 | Wagenblast | B29C 45/14467 | 108/51.11 |
| 6,680,017 B1 * | 1/2004 | Koch | B29C 37/0085 | 264/171.16 |
| 6,681,876 B1 * | 1/2004 | Haneda | B62D 25/084 | 180/68.4 |
| 6,761,187 B1 * | 7/2004 | Zoellner | B29C 37/0085 | 138/155 |
| 6,858,276 B1 * | 2/2005 | Chomier | B29C 45/14336 | 264/257 |
| 6,955,394 B1 * | 10/2005 | Reddig | B62D 25/142 | 296/193.02 |
| 7,115,324 B1 * | 10/2006 | Stol | B23K 9/02 | 428/594 |
| 9,233,526 B2 * | 1/2016 | VanSweden | B32B 38/162 | |
| 9,610,981 B1 * | 4/2017 | Bach | B62D 25/06 | |
| 2001/0025462 A1 * | 10/2001 | Laurent | B62D 29/001 | 52/426 |
| 2001/0042353 A1 * | 11/2001 | Honda | B29C 44/1228 | 296/146.6 |
| 2001/0053431 A1 * | 12/2001 | Goldbach | B29C 45/14467 | 428/139 |
| 2002/0060476 A1 * | 5/2002 | Cantineau | B62D 25/084 | 296/193.09 |
| 2002/0084122 A1 * | 7/2002 | Emori | B29C 45/14065 | 180/68.4 |
| 2002/0101086 A1 * | 8/2002 | Koch | B60R 19/04 | 293/133 |
| 2002/0109263 A1 * | 8/2002 | Goldbach | B29C 45/14467 | 264/271.1 |
| 2002/0157775 A1 * | 10/2002 | Bauhoff | B29C 45/14311 | 156/245 |
| 2002/0160145 A1 * | 10/2002 | Bauhoff | B29C 45/14311 | 428/99 |
| 2003/0008105 A1 * | 1/2003 | Haack | B29C 70/088 | 428/136 |
| 2003/0070387 A1 * | 4/2003 | Klocke | B60N 2/682 | 52/638 |
| 2003/0077409 A1 * | 4/2003 | Schnell | B29C 45/1418 | 428/35.8 |
| 2003/0152318 A1 * | 8/2003 | Ishii | B21D 28/28 | 385/25 |
| 2003/0152745 A1 * | 8/2003 | Wagenblast | B29C 45/14467 | 428/119 |
| 2003/0159261 A1 * | 8/2003 | Kappenstein | B29C 45/14311 | 29/17.1 |
| 2003/0214155 A1 * | 11/2003 | Kiehl | B62D 21/02 | 296/204 |
| 2004/0011513 A1 * | 1/2004 | Haneda | B62D 25/084 | 165/148 |
| 2004/0018341 A1 | 1/2004 | Richardson et al. | | |
| 2004/0037625 A1 * | 2/2004 | Corrias | B62D 29/001 | 403/172 |
| 2004/0046422 A1 * | 3/2004 | Igura | B29C 45/14311 | 296/193.09 |
| 2004/0066106 A1 * | 4/2004 | Hull | F16B 5/04 | 310/91 |
| 2004/0070113 A1 * | 4/2004 | Ilse | B29C 45/14344 | 264/255 |
| 2004/0094684 A1 * | 5/2004 | Sailer | B62D 29/001 | 248/424 |
| 2004/0105949 A1 * | 6/2004 | Krause | B29C 45/14467 | 428/57 |
| 2004/0131418 A1 * | 7/2004 | Budde | B60G 7/001 | 403/278 |
| 2004/0187289 A1 * | 9/2004 | Toback | E04B 1/24 | 29/458 |
| 2004/0195833 A1 * | 10/2004 | Zoellner | B29C 37/0085 | 285/285.1 |
| 2004/0197508 A1 * | 10/2004 | Zoellner | B29C 37/0085 | 428/36.9 |
| 2004/0222665 A1 * | 11/2004 | Roeth | B62D 29/008 | 296/187.01 |
| 2004/0232591 A1 * | 11/2004 | Dajek | B29C 45/14467 | 264/259 |
| 2005/0050730 A1 * | 3/2005 | Marando | B22D 19/045 | 29/897.2 |
| 2005/0140158 A1 * | 6/2005 | Ogawa | B62D 25/07 | 296/29 |
| 2005/0140173 A1 * | 6/2005 | Riviere | B29C 45/14311 | 296/187.01 |
| 2005/0276970 A1 * | 12/2005 | Busseuil | B62D 25/00 | 428/343 |
| 2006/0008615 A1 * | 1/2006 | Muteau | B29C 44/385 | 428/116 |
| 2006/0147672 A1 * | 7/2006 | Ruiz | B29C 45/0053 | 428/137 |
| 2006/0188694 A1 * | 8/2006 | McLeod | B29C 44/18 | 428/138 |
| 2007/0051465 A1 * | 3/2007 | Naughton | B29C 65/54 | 156/305 |
| 2007/0057535 A1 * | 3/2007 | Wolf | B29C 45/006 | 296/193.02 |
| 2007/0071929 A1 * | 3/2007 | Haimoff | B29C 37/0085 | 428/36.91 |
| 2007/0131012 A1 * | 6/2007 | Eipper | B29C 45/14221 | 72/46 |
| 2007/0134452 A1 * | 6/2007 | Merkle | B60H 1/00564 | 428/34.1 |
| 2007/0139940 A1 * | 6/2007 | Jung | B62D 25/084 | 362/460 |
| 2007/0182180 A1 * | 8/2007 | Eipper | B29C 45/14467 | 296/2 |
| 2007/0257497 A1 * | 11/2007 | Heatherington | B60R 19/18 | 293/120 |
| 2007/0262617 A1 * | 11/2007 | Feith | B62D 25/142 | 296/205 |
| 2008/0116701 A1 * | 5/2008 | Boumaza | B29C 45/14311 | 293/120 |

(56) References Cited

U.S. PATENT DOCUMENTS

| | | | | |
|---|---|---|---|---|
| 2008/0138646 A1* | 6/2008 | Frankenmolen | B62D 29/001 | 428/621 |
| 2008/0149256 A1* | 6/2008 | Wang | B21J 15/025 | 156/92 |
| 2008/0173696 A1* | 7/2008 | Gendou | B21J 15/025 | 228/112.1 |
| 2008/0197669 A1* | 8/2008 | Schleichert | B62D 25/142 | 296/181.1 |
| 2008/0317988 A1* | 12/2008 | Mooijman | B62D 29/001 | 428/36.9 |
| 2009/0148662 A1* | 6/2009 | Li | B29C 45/1671 | 428/138 |
| 2009/0188206 A1* | 7/2009 | Stol | B23K 31/027 | 52/762 |
| 2009/0194224 A1* | 8/2009 | Jendrny | B21J 15/02 | 156/92 |
| 2009/0212600 A1* | 8/2009 | Fischer | B62D 25/084 | 296/193.09 |
| 2009/0278371 A1* | 11/2009 | Fuchs | B23K 11/11 | 296/29 |
| 2009/0294410 A1* | 12/2009 | Iwase | B21J 15/025 | 219/91.23 |
| 2009/0309387 A1* | 12/2009 | Goral | B29C 45/14778 | 296/187.03 |
| 2010/0092733 A1* | 4/2010 | Blank | C09J 163/00 | 428/174 |
| 2010/0098969 A1* | 4/2010 | Hashimura | B21J 15/025 | 428/653 |
| 2010/0101090 A1* | 4/2010 | Nakano | B22C 9/22 | 29/897.2 |
| 2010/0148527 A1* | 6/2010 | Frank | B60R 19/34 | 293/155 |
| 2010/0173125 A1* | 7/2010 | Malek | B29C 45/14 | 428/138 |
| 2010/0181804 A1* | 7/2010 | Malvino | B62D 23/005 | 296/205 |
| 2010/0183848 A1* | 7/2010 | Krause | B29C 45/14778 | 428/167 |
| 2010/0187865 A1* | 7/2010 | Malek | B62D 25/02 | 296/203.03 |
| 2010/0207426 A1* | 8/2010 | Tsuruta | B62D 21/157 | 296/187.12 |
| 2010/0244497 A1* | 9/2010 | Honda | B62D 21/02 | 296/205 |
| 2010/0289242 A1* | 11/2010 | Nitsche | B29C 65/486 | 280/124.155 |
| 2011/0131917 A1* | 6/2011 | Anderson | C09J 5/00 | 52/704 |
| 2011/0133517 A1* | 6/2011 | Leanza | B62D 27/02 | 296/203.01 |
| 2011/0158741 A1* | 6/2011 | Knaebel | B62D 23/005 | 403/265 |
| 2011/0206890 A1* | 8/2011 | Belpaire | B62D 29/002 | 428/68 |
| 2011/0316320 A1* | 12/2011 | Kulkarni | B60N 2/682 | 297/452.48 |
| 2012/0043019 A1* | 2/2012 | Belpaire | B29C 44/1228 | 156/293 |
| 2012/0139294 A1* | 6/2012 | Geiger | B62D 27/026 | 296/191 |
| 2012/0214018 A1* | 8/2012 | Mizrahi | B32B 15/08 | 428/600 |
| 2012/0235401 A1* | 9/2012 | Richardson | B62D 27/023 | 285/285.1 |
| 2012/0267917 A1* | 10/2012 | Weigl | B62D 25/20 | 296/193.07 |
| 2012/0315414 A1* | 12/2012 | Wesch | B60G 7/001 | 428/34.1 |
| 2013/0026796 A1* | 1/2013 | Wagner | B23K 26/28 | 296/204 |
| 2013/0049392 A1* | 2/2013 | Kurogi | B62D 25/02 | 296/30 |
| 2013/0052392 A1* | 2/2013 | Radlmayr | B29C 70/688 | 428/68 |
| 2013/0057018 A1* | 3/2013 | Reese | B29C 45/1418 | 296/146.6 |
| 2013/0113237 A1* | 5/2013 | Huhn | B21D 53/88 | 296/193.05 |
| 2013/0193713 A1* | 8/2013 | Reese | B29C 45/14467 | 296/181.2 |
| 2013/0234472 A1* | 9/2013 | Diaz Sanchez | B62D 29/004 | 296/193.09 |
| 2013/0249250 A1* | 9/2013 | Ohhama | B62D 21/11 | 296/204 |
| 2013/0270229 A1* | 10/2013 | Pedersen | B21J 15/02 | 219/106 |
| 2013/0309520 A1* | 11/2013 | Lang | F16B 5/10 | 428/594 |
| 2014/0016993 A1* | 1/2014 | Itoh | B32B 37/18 | 403/270 |
| 2014/0030010 A1* | 1/2014 | Itoh | F16B 5/08 | 403/270 |
| 2014/0183895 A1* | 7/2014 | Awano | B62D 29/005 | 296/29 |
| 2014/0186099 A1* | 7/2014 | Klaukien | B64C 1/406 | 403/267 |
| 2014/0212637 A1* | 7/2014 | Syvret | B32B 37/1292 | 428/201 |
| 2014/0241790 A1* | 8/2014 | Woleader | B29C 66/12441 | 403/270 |
| 2014/0284966 A1* | 9/2014 | Maier | B62D 25/085 | 296/193.04 |
| 2014/0301775 A1* | 10/2014 | Ehrlich | B62D 27/02 | 403/267 |
| 2014/0328614 A1* | 11/2014 | Fleischheuer | B60N 2/682 | 403/267 |
| 2014/0334868 A1* | 11/2014 | Apfel | C08K 3/10 | 403/267 |
| 2015/0166105 A1* | 6/2015 | Zander | B62D 21/11 | 180/312 |
| 2015/0197289 A1* | 7/2015 | Kurokawa | B62D 29/005 | 296/187.08 |
| 2015/0283757 A1* | 10/2015 | Koerwien | B32B 7/00 | 428/195.1 |
| 2016/0009319 A1* | 1/2016 | Langendorf | B21D 39/026 | 296/191 |
| 2016/0016229 A1* | 1/2016 | Czinger | B22F 3/1055 | 296/205 |
| 2016/0016359 A1* | 1/2016 | Kondo | B29C 70/68 | 428/139 |
| 2016/0017909 A1* | 1/2016 | Erlacher | C09J 5/08 | 403/265 |
| 2016/0107348 A1* | 4/2016 | Preisser | B29C 45/0001 | 264/258 |
| 2016/0136880 A1* | 5/2016 | Matsuo | B23K 11/20 | 411/82 |
| 2016/0138637 A1* | 5/2016 | Kurokawa | F16B 5/045 | 411/82.1 |
| 2016/0158873 A1* | 6/2016 | Amedick | B23K 11/004 | 219/86.1 |
| 2016/0193988 A1* | 7/2016 | Plotzitzka | B60S 5/00 | 403/266 |
| 2016/0200182 A1* | 7/2016 | Ogawa | B21D 39/028 | 403/267 |
| 2016/0288243 A1* | 10/2016 | Riether | B23K 11/0066 | |
| 2016/0325796 A1* | 11/2016 | Czinger | B62D 27/023 | |
| 2016/0339966 A1* | 11/2016 | Iwase | B60J 5/0469 | |
| 2017/0008206 A1* | 1/2017 | Schoenhammer | B29C 45/14631 | |
| 2017/0216956 A1* | 8/2017 | Kotschote | B23K 11/115 | |
| 2017/0327157 A1* | 11/2017 | Jaunasse | B29C 43/18 | |

FOREIGN PATENT DOCUMENTS

| | | | | |
|---|---|---|---|---|
| DE | 2531387 A1 * | 1/1977 | | B29C 45/14467 |
| DE | 2739867 A1 * | 3/1978 | | B23K 11/0066 |
| DE | 2932027 A1 * | 2/1980 | | B62D 25/02 |
| DE | 3210310 A1 * | 9/1983 | | B23K 11/002 |

(56) References Cited

FOREIGN PATENT DOCUMENTS

| | | | | |
|---|---|---|---|---|
| DE | 3737210 A1 * | 5/1989 | ......... | B29C 65/7855 |
| DE | 3811427 A1 * | 10/1989 | ......... | B29C 66/5241 |
| DE | 19508970 A1 * | 2/1996 | ............ | B62D 25/02 |
| DE | 19737966 A1 * | 8/1998 | ............ | B29C 65/562 |
| DE | 19827549 A1 * | 12/1999 | ............ | B32B 15/04 |
| DE | 19831982 A1 * | 1/2000 | ............ | B29C 65/54 |
| DE | 19833615 A1 * | 1/2000 | ............ | F16L 13/103 |
| DE | 19929057 A1 * | 12/2000 | ............ | B62D 23/005 |
| DE | 19929480 A1 * | 12/2000 | ................ | C09J 5/00 |
| DE | 19934545 C1 * | 3/2001 | ....... | B29C 45/14221 |
| DE | 19956607 A1 * | 5/2001 | ....... | B29C 45/14311 |
| DE | 10037374 C1 * | 2/2002 | ............ | B62D 29/001 |
| DE | 10137994 C1 * | 12/2002 | ....... | B29C 45/14467 |
| DE | 10237673 A1 * | 2/2004 | ............ | B62D 25/084 |
| DE | 102004017108 A1 * | 9/2005 | | |
| DE | 102005012778 A1 * | 11/2006 | ............ | B62D 25/00 |
| DE | 102006036931 A1 * | 2/2008 | ............ | B62D 29/001 |
| DE | 102008048896 A1 * | 5/2009 | ............ | B62D 25/16 |
| DE | 102008028686 A1 * | 7/2009 | ............ | B62D 27/023 |
| DE | 102009015637 A1 * | 10/2010 | ............ | B62D 25/082 |
| DE | 102010014503 A1 * | 10/2011 | ............ | B29C 44/128 |
| DE | 102010026040 A1 * | 1/2012 | ............ | B23K 1/0004 |
| DE | 102012011862 A1 * | 3/2013 | ............ | B62D 29/005 |
| DE | 102011120125 A1 * | 6/2013 | ............ | B62D 29/001 |
| DE | 102012205594 A1 * | 10/2013 | | |
| DE | 102013000629 A1 * | 7/2014 | ............ | B62D 25/20 |
| EP | 0587927 A1 * | 3/1994 | ....... | B29C 45/14514 |
| EP | 0792788 A1 * | 9/1997 | ............ | B62D 27/026 |
| EP | 0908632 A1 * | 4/1999 | ............ | B21J 15/02 |
| EP | 1138430 A2 * | 10/2001 | ............ | B21J 15/08 |
| EP | 1232935 A1 * | 8/2002 | ............ | B62D 29/001 |
| EP | 1306292 A2 * | 5/2003 | ....... | B29C 45/14311 |
| EP | 1495947 A2 * | 1/2005 | ............ | B62D 29/001 |
| EP | 2078870 A2 * | 7/2009 | ............ | B60G 21/051 |
| EP | 2233386 A1 * | 9/2010 | ............ | B62D 27/02 |
| EP | 2336004 A1 * | 6/2011 | ............ | B60P 1/283 |
| FR | 2796913 A1 * | 2/2001 | ............ | B62D 25/085 |
| FR | 2885585 A1 * | 11/2006 | ....... | B29C 45/14311 |
| GB | 1394492 A * | 5/1975 | ............ | B60R 19/03 |
| GB | 2028960 A * | 3/1980 | ............ | B62D 25/02 |
| GB | 2196584 A * | 5/1988 | ............ | B62D 29/001 |
| GB | 2370803 A * | 7/2002 | ....... | B29C 45/14311 |
| JP | 48-18955 B1 | 6/1973 | | |
| JP | 53-128676 A | 11/1978 | | |
| JP | 55102782 A * | 8/1980 | ............ | B62D 25/04 |
| JP | 56067214 A * | 6/1981 | ............ | B62D 25/02 |
| JP | 62105880 U * | 7/1987 | | |
| JP | 01293984 A * | 11/1989 | | |
| JP | 5-293848 A | 11/1993 | | |
| JP | 06126464 A * | 5/1994 | ......... | B29C 66/5241 |
| JP | 06142941 A * | 5/1994 | | |
| JP | 07214338 A * | 8/1995 | | |
| JP | 09144725 A * | 6/1997 | | |
| JP | 10246211 A * | 9/1998 | | |
| JP | 2000179513 A * | 6/2000 | | |
| JP | 2001335973 A * | 12/2001 | | |
| JP | 2003341547 A * | 12/2003 | | |
| JP | 2004130986 A * | 4/2004 | | |
| JP | 2005-1615 A | 1/2005 | | |
| JP | 2005001615 A * | 1/2005 | | |
| JP | 2006167752 A * | 6/2006 | | |
| JP | 2007046646 A * | 2/2007 | ............ | B21J 15/10 |
| JP | 2007098439 A * | 4/2007 | | |
| JP | 2007131053 A * | 5/2007 | | |
| JP | 2007-302147 A | 11/2007 | | |
| JP | 2007283841 A * | 11/2007 | | |
| JP | 2008000754 A * | 1/2008 | | |
| JP | 2008-105325 A | 5/2008 | | |
| JP | 2008215423 A * | 9/2008 | | |
| JP | 2008222013 A * | 9/2008 | | |
| JP | 2009002406 A * | 1/2009 | | |
| JP | 2009-298144 A | 12/2009 | | |
| JP | 2011098619 A * | 5/2011 | | |
| JP | 2012071631 A * | 4/2012 | | |
| JP | 2013133044 A * | 7/2013 | | |
| JP | 2013154754 A * | 8/2013 | | |
| JP | 2014-580 A | 1/2014 | | |
| JP | 2014073798 A * | 4/2014 | | |
| JP | 2014-218179 A | 11/2014 | | |
| JP | 2016022881 A * | 2/2016 | ............ | B62D 25/20 |
| KR | 20070066320 A * | 6/2007 | ........... | B62D 27/023 |
| WO | WO-8702745 A1 * | 5/1987 | ........... | B62D 27/026 |
| WO | WO-0181155 A2 * | 11/2001 | ........... | B62D 23/005 |
| WO | WO-2006002900 A1 * | 1/2006 | ........... | B62D 25/142 |
| WO | WO-2006099648 A2 * | 9/2006 | ............ | B62D 25/04 |
| WO | WO-2016013317 A1 * | 1/2016 | ............ | B62D 25/20 |
| WO | WO-2016030591 A1 * | 3/2016 | ........... | B62D 25/084 |

OTHER PUBLICATIONS

Machine Translation of DE 102004017108 A1, Sep. 2005 (Year: 2005).*

International Search Report dated Apr. 12, 2016, in PCT/JP2016/050962 filed Jan. 14, 2016.

* cited by examiner

JOINING STRUCTURE

TECHNICAL FIELD

The present invention relates to joining structures.

BACKGROUND ART

In recent years, in order to confront global environmental issues caused by, for example, exhaust gas, fuel efficiency has been improved by reducing the weight of vehicle bodies of transporters, such as automobiles. Furthermore, in order to increase safety in the event of a vehicle collision without inhibiting this weight reduction of vehicle bodies as much as possible, a technology for partially replacing a conventionally-used material with another material has been studied. Examples that have been carried out include partially replacing a steel material, which has been conventionally used, with a light alloy material that is lighter in weight and has high energy absorbency, such as aluminum alloy material or a magnesium material, or using high-tensile steel with higher strength in a part of the frame.

Normally, it is difficult to weld different types of metallic materials to each other. For example, when welding aluminum and steel to each other, $Fe_2Al_5$, which is a high-hardness and extremely-fragile intermetallic compound layer of Fe and Al, is produced at the joint interface, thus causing the joining strength to decrease.

Therefore, there has been studied a joining structure obtained by inserting a steel connection member into an aluminum frame and welding the steel connection member to another frame composed of steel (Patent Literature 1). In another disclosed joining structure, a first member and a second member are joined to each other by spot-welding the end of a rivet clinched to the first member to the second member, so that dissimilar metallic materials are joined to each other while suppressing the occurrence of intermetallic compounds (Patent Literature 2).

Furthermore, there has also been studied disposing resin at the inner side of a part where metallic members are combined with each other so as to increase rigidity and shock absorption (See Patent Literatures 3 and 4).

CITATION LIST

Patent Literature

PTL 1: Japanese Unexamined Patent Application Publication No. 2007-302147
PTL 2: Japanese Unexamined Patent Application Publication No. 2014-580
PTL 3: Japanese Unexamined Patent Application Publication No. 2005-1615
PTL 4: Japanese Unexamined Patent Application Publication No. 2014-218179

SUMMARY OF INVENTION

Technical Problem

In the joining structure according to Patent Literature 1, there is no possibility of the occurrence of fragile intermetallic compounds. However, when inserting the steel connection member into the aluminum member, it is difficult to accurately set the steel connection member. Moreover, in order to ensure corrosion resistance of the connected area against immersion of water, it is necessary to apply a sealant to the boundary between the aluminum member and the steel connection member. Thus, the number of manufacturing steps increases. In addition, because the sealant may delaminate depending on the usage environment, it is difficult to ensure corrosion resistance for an extended period of time.

The joining structure according to Patent Literature 2 has a problem similar to that of Patent Literature 1 since it is also necessary to apply a sealant to the boundary between the dissimilar metallic materials for preventing corrosion of the members caused by immersion of water.

In the resinous composite frame member according to Patent Literature 3, the resin is disposed between the metallic members so that the frame rigidity is increased. However, in a state where the resin is provided on the surface of one of the metallic members, the other metallic member is combined therewith, thus resulting in an increased number of manufacturing steps. Moreover, there is a possibility that a gap may form between the resin provided on the one metallic member and the other metallic member combined therewith after forming the resin. Therefore, it is not possible to sufficiently prevent immersion of moisture between the metallic member and the resin, sometimes making it difficult to achieve the desired anticorrosion effect.

Likewise, since a gap forms between the metallic member and the resin member in the resin composite frame according to Patent Literature 4, it is not possible to sufficiently prevent immersion of moisture. Moreover, in a case where the metallic materials used are dissimilar metallic materials (e.g., aluminum and steel), it is necessary to provide the metallic members with a sealant for preventing electrolytic corrosion, thus resulting in an increased number of manufacturing steps. Moreover, since the sealant may readily delaminate depending on the usage environment, it is difficult to ensure durability for an extended period of time.

The present invention has been made in view of the circumstances described above, and an object thereof is to provide a highly-rigid joining structure by which different members can be securely joined to each other without a complicated manufacturing process and that can prevent corrosion from occurring.

Solution to Problem

A joining structure according to the present invention includes a first member, a second member composed of a material different from that of the first member, and separation means that is at least provided between the first member and the second member and that separates the first member and the second member from each other. Resin is injected between an end of one of the first member and the second member and the other member.

As an aspect of the aforementioned joining structure, the separation means may be configured separately from the first member and the second member.

As an aspect of the aforementioned joining structure, the separation means may be a protrusion that is provided in at least one of the first member and the second member and that protrudes from one of the members toward the other member.

As an aspect of the aforementioned joining structure, a surface of at least one of the first member and the second member opposite from a side where the first member and the second member face each other may be provided with resin.

As an aspect of the aforementioned joining structure, the resin provided on the opposite surface may be provided with a reinforcement section that protrudes outward from a resin surface.

As an aspect of the aforementioned joining structure, at least one of the first member and the second member may have a through-hole extending therethrough between a front side and a rear side thereof, and the through-hole may be filled with resin.

As an aspect of the aforementioned joining structure, an overlap section where the first member and the second member are disposed in an overlapping manner in a thickness direction of the members in a state where the first member and the second member are separated from each other may be filled with the resin such that a cross section orthogonal to a longitudinal direction of the first member and the second member has a closed cross-sectional shape.

As an aspect of the aforementioned joining structure, a part of at least one of the first member and the second member that forms at least one of an interior and an exterior of the closed cross-sectional may be covered with resin.

As an aspect of the aforementioned joining structure, a metallic material included in the first member and a metallic material included in the second member may be different types of metallic materials.

Advantageous Effects of Invention

According to the present invention, the first member and the second member are separated from each other by the separation means, and resin is injected between the end of at least one of the first member and the second member and the other member, so that the first member and the second member are securely joined together by the resin. Thus, the rigidity of the joining structure is increased. Moreover, immersion of moisture is prevented by the resin between the first member and the second member, so that rust, corrosion, and electrolytic corrosion are prevented from occurring.

DESCRIPTION OF EMBODIMENTS

An embodiment of the present invention will be described in detail below with reference to the drawings. As an example of a joining structure, a joining structure used for connection of a vehicle frame structure, such as a sub-frame, will be described.

First Configuration Example of Joining Structure

Figure 1:
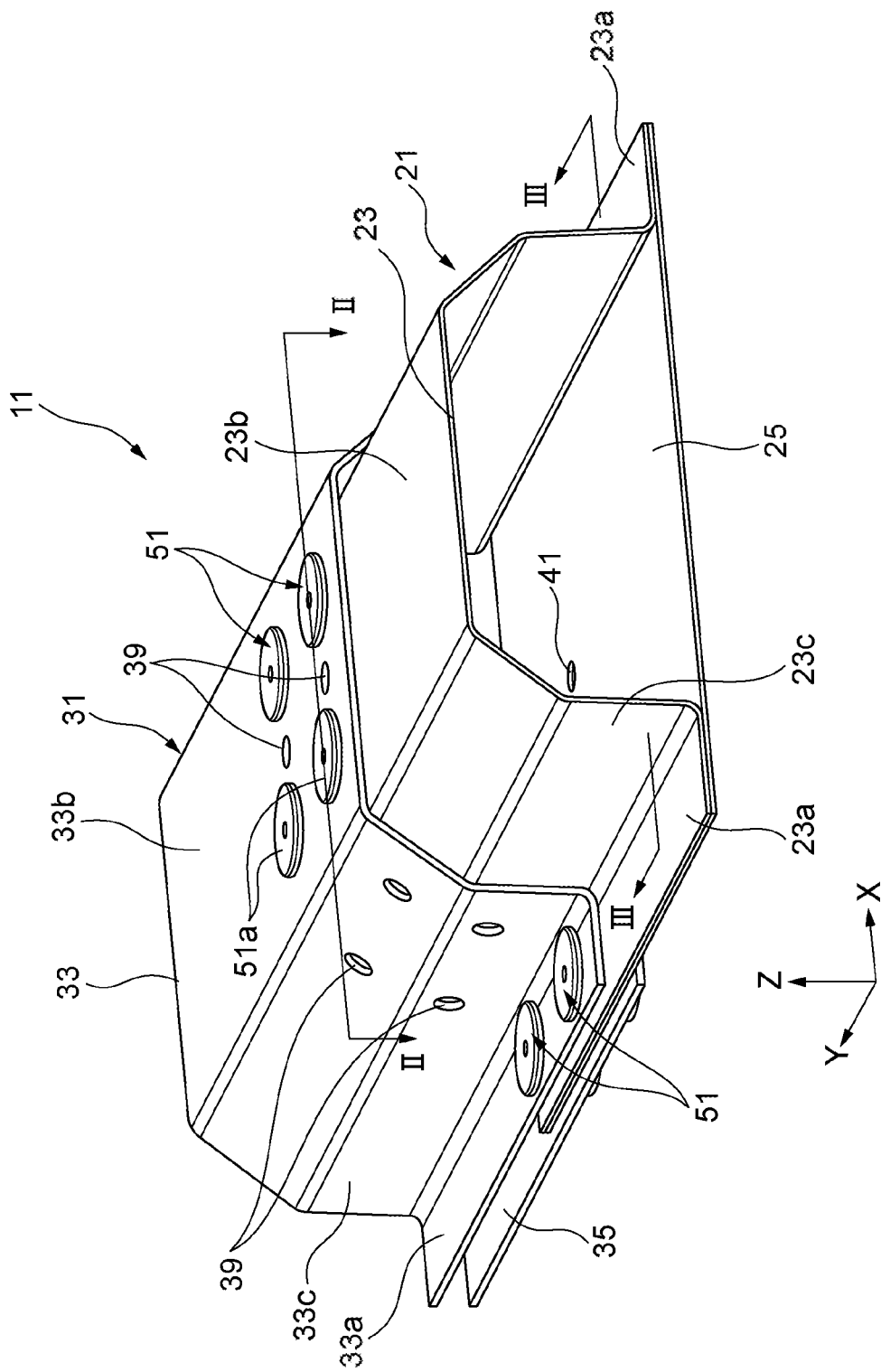
FIG. 1 is a diagram for explaining an embodiment of the present invention and is a perspective view illustrating a frame member of a joining structure before a resin molding process.
Figure 2:
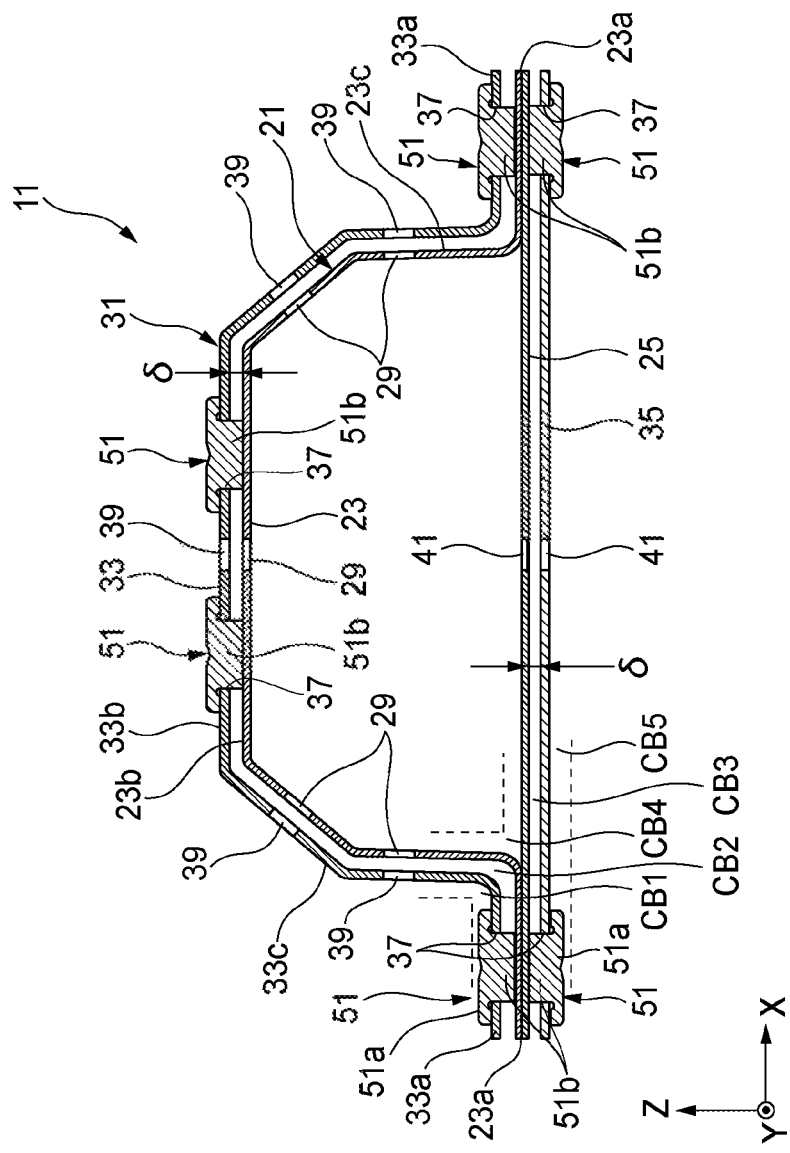
FIG. 2 is a cross-sectional view taken along line II-II in FIG. 1.
Figure 3:
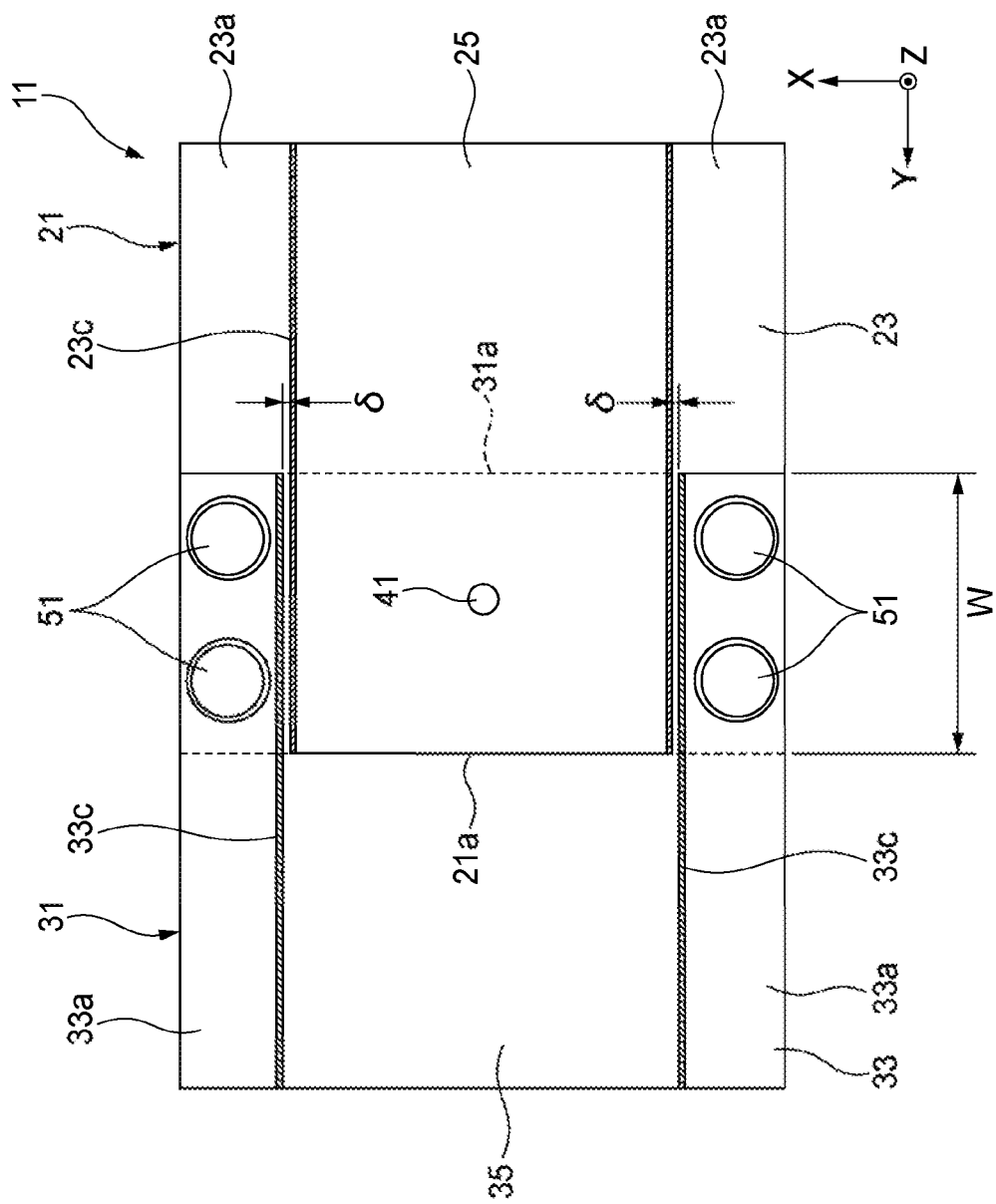
FIG. 3 is a cross-sectional view taken along line III-III in FIG. 1.
Figure 4:
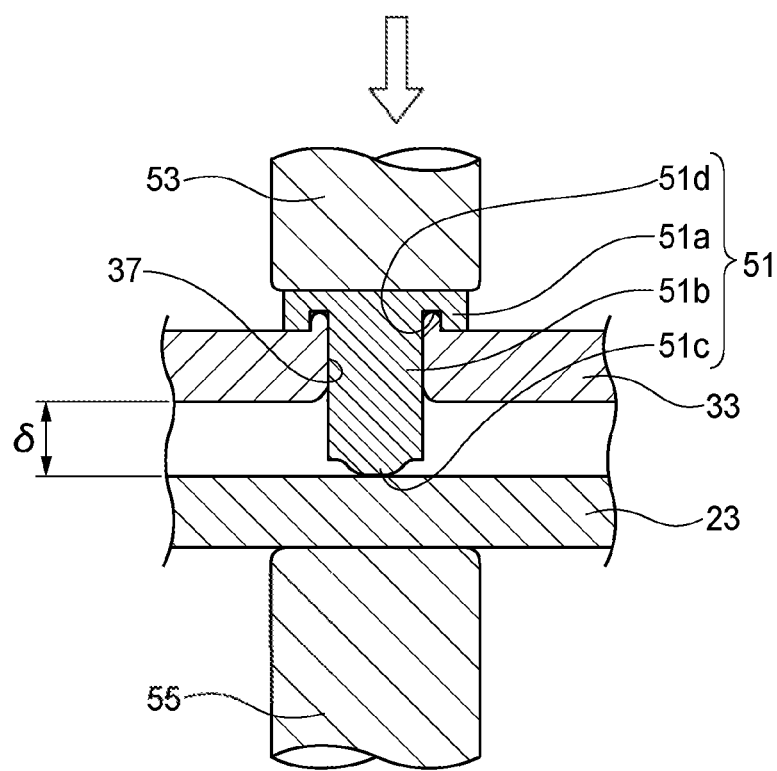
FIG. 4 is a cross-sectional view illustrating a step for attaching a rivet used for manufacturing the joining structure in FIG. 1.

FIG. 1 is a diagram for explaining an embodiment of the present invention and is a perspective view illustrating a frame member of the joining structure before a resin molding process. FIG. 2 is a cross-sectional view taken along line II-II in FIG. 1. FIG. 3 is a cross-sectional view taken along line III-III in FIG. 1. FIG. 4 is a cross-sectional view illustrating a step for attaching a rivet used for manufacturing the joining structure.

As shown in FIGS. 1 and 2, the joining structure according to this configuration example includes a frame member 11 formed by overlapping longitudinal ends of two types of plates composed of different materials, and also includes a resin section 13 (see FIG. 5), which will be described in detail later, formed in the overlapping region of the plates.

The frame member 11 includes a first member 21 formed of a steel plate and a second member 31 formed of an aluminum plate. The first member 21 has a first panel member 23 having a substantially inverted U shape in cross section and a first base plate member 25 having a tabular shape. The first panel member 23 has flanges 23a at the opposite sides in a frame width direction (i.e., X direction) orthogonal to a frame joining direction (i.e., Y direction). The flanges 23a are joined to the first base plate member 25 by, for example, spot-welding.

The second member 31 has a second panel member 33 one size larger than the first panel member 23 and having a substantially inverted U shape in cross section, and also has a second base plate member 35 having a tabular shape. The second panel member 33 has flanges 33a at the opposite sides in the frame width direction (i.e., X direction). The flanges 33a are separated from the second base plate member 35. Specifically, as shown in FIGS. 1 and 2, the second member 31 is disposed to partially cover the outer side of the first member 21.

As shown in FIG. 3, one end 21a of the first member 21 in the longitudinal direction (i.e., Y direction) thereof and one end 31a of the second member 31 in the longitudinal direction (i.e., Y direction) thereof overlap each other in the thickness direction of the first member 21 and the second member 31 with a separation distance δ therebetween. Specifically, as shown in FIG. 2, the second panel member 33 is disposed to cover the outer side of the first panel member 23 with the separation distance δ therebetween in the overlapping region W, and the second base plate member 35 is disposed below the first base plate member 25 with the separation distance δ therebetween in the overlapping region W.

The separation distance δ between the first panel member 23 and the second panel member 33 and the separation distance δ between the second base plate member 35 and the first base plate member 25 are formed by a plurality of rivets (separation means) 51 that are configured separately from the first panel member 23 and the second panel member 33.

In detail, shanks 51 b of the rivets 51 extend through a plurality of locations in the flanges 33a and a top surface 33b of the second panel member 33 and in the second base plate member 35. By using a counter punch (not shown) disposed face each rivet 51, a part of the second panel member 33 is pressed upward by being made to plastically flow into a groove 51d provided in a head 51a of each rivet 51. Consequently, each rivet 51 becomes clinched to the second panel member 33. Because the shank length of the shank 51b of each rivet 51 is larger than the thickness of the second panel member 33, a uniform separation distance δ is set between the second panel member 33 and the first panel member 23.

It is preferable that each rivet 51 be a forged product having a head 51a and a shank 51b in view of forgeability and attachability. If the component that is to undergo spot-welding is a steel material, it is preferable that each rivet 51 be composed of steel for increasing the joining strength, and soft steel, stainless steel, or high-tensile steel, for example, may be used in accordance with the intended purpose. If the component that is to undergo spot-welding is an aluminum material, it is preferable to match the component that is to undergo spot-welding with the type of material of the rivet, such as using aluminum or an aluminum alloy as the rivet, for ensuring enough joining strength. As a method for fixing the members 21 and 31 to each other by using the rivets 51, for example, the method disclosed in Japanese Unexamined Patent Application Publication No. 7-214338 or 2010-207898 can be used, where appropriate.

The shanks 51b of the rivets 51 may be configured to be clinched to pilot holes 37 preliminarily formed in the second panel member 33.

As shown in FIG. 4, the joining process of each rivet 51 may involve brining a distal end 51c of the rivet 51 into contact with the first panel member 23 and applying electricity between a pair of electrodes 53 and 55 in a state where the head 51a of the rivet 51 and the first panel member 23 are pressed and clamped between the electrodes 53 and 55. Consequently, the distal end 51c of the rivet 51 and the first panel member 23 are resistance-spot-welded together. As a result of this resistance-spot-welding, the first member 21 and the second member 31 are fixed to each other with the separation distance δ therebetween or with a distance therebetween slightly smaller than the separation distance δ. The dimension of the separation distance δ can be arbitrarily set by adjusting the shank length of the shanks 51b.

The rivets 51 provided at the top surface 33b of the second panel member 33, as shown in FIG. 2, are fixed to a top surface 23b of the first panel member 23 in the above-described manner. Furthermore, the rivets 51 provided at the flanges 33a of the second panel member 33 are fixed to the flange 23a of the first panel member 23. The rivets 51 provided at the second base plate member 35, which are at the opposite side from the rivet 51 provided at the flanges 33a, are fixed to the first base plate member 25.

As shown in FIGS. 1 and 2, the first panel member 23 and the second panel member 33 have a plurality of through-holes 29 and 39 that extend through the first panel member 23 and the second panel member from the front side to the back side thereof and that are provided in the flanges 23a and 33a, the top surfaces 23b and 33b, and side surfaces (including inclined surfaces) 23c and 33c, respectively. Moreover, the first base plate member 25 and the second base plate member 35 have resin feed holes 41 that extend therethrough from the front side to the back side thereof and that are provided for feeding resin from a gate (not shown).

The frame member 11 formed by joining the first member 21 and the second member 31 together with the rivets 51 is set within a resin-molding mold (not shown), and resin is injection-molded into a cavity defined by the overlapping region W between the first member 21 and the second member 31.

Although not shown, the resin-molding mold has an outer frame and a core to be inserted into the outer frame. The above-described frame member is set between the inner peripheral surface of the outer frame and the core, and the resin is injected into the cavity.

As shown in FIG. 2, the cavity includes a separation space CB1 between the inner peripheral surface of the outer frame of the resin-molding mold and the second panel member 33, a separation space CB2 between the second panel member 33 and the first panel member 23, a separation space CB3 between the second base plate member 35 and the first base plate member 25, a separation space CB4 within the first member 21 and formed between the outer peripheral surface of the core to be inserted in the Y direction and the first member 21, and a separation space CB5 between the inner peripheral surface of the outer frame of the resin-molding mold and the second base plate member 35.

The resin may be injected into the cavity not only through the resin feed holes 41, which are through-holes, but also from, for example, the longitudinal direction (Y direction) of the frame member.

As described above, the joining-structure manufacturing process that involves joining the frame member and performing resin-molding includes a step of joining the first member 21 and the second member 31 in a state where they are separated from each other via, for example, the rivets 51, and a step of injecting resin between at least one of the first member 21 and the second member 31, which are joined together, and the other member by injection-molding.

Figure 5:
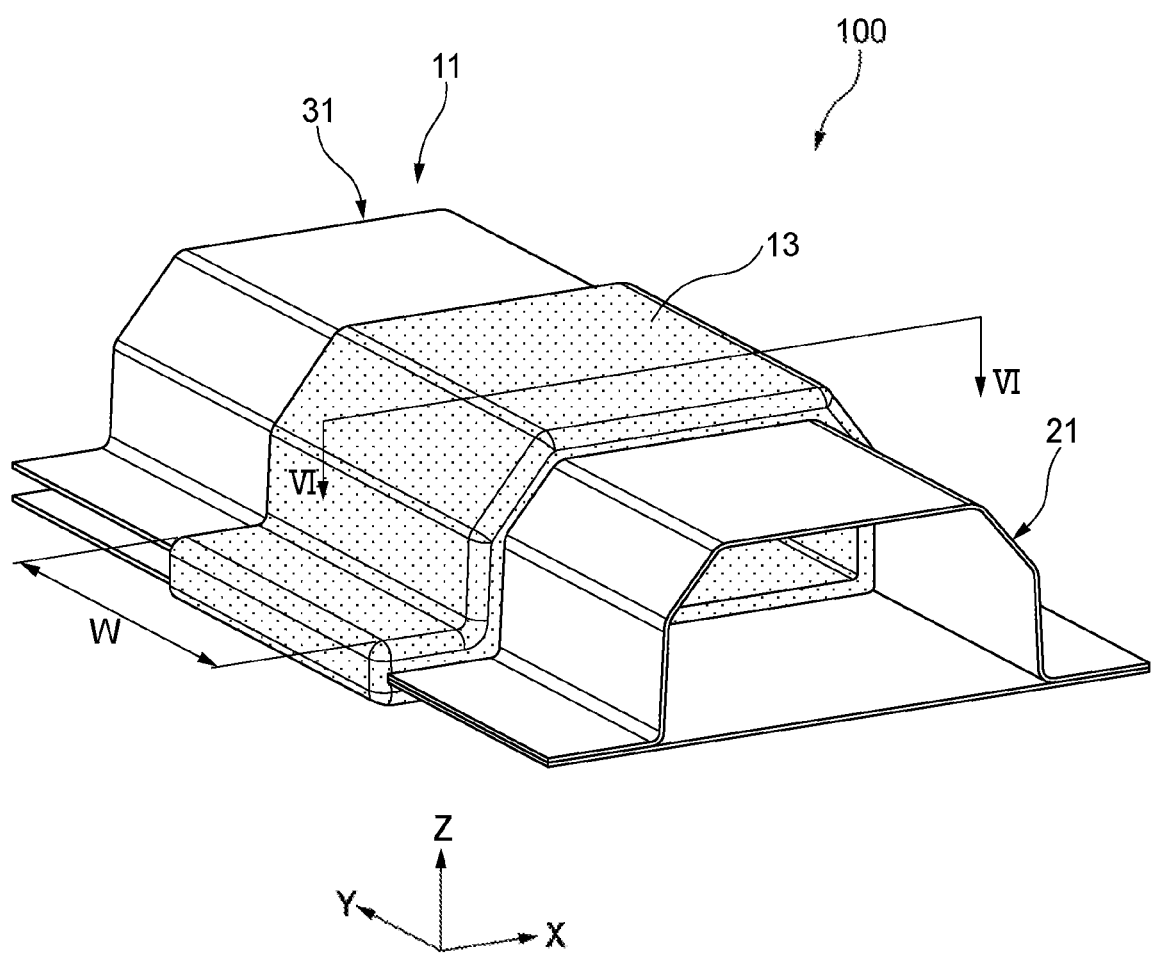
FIG. 5 is a perspective view illustrating a first configuration example of a joining structure.
Figure 6:
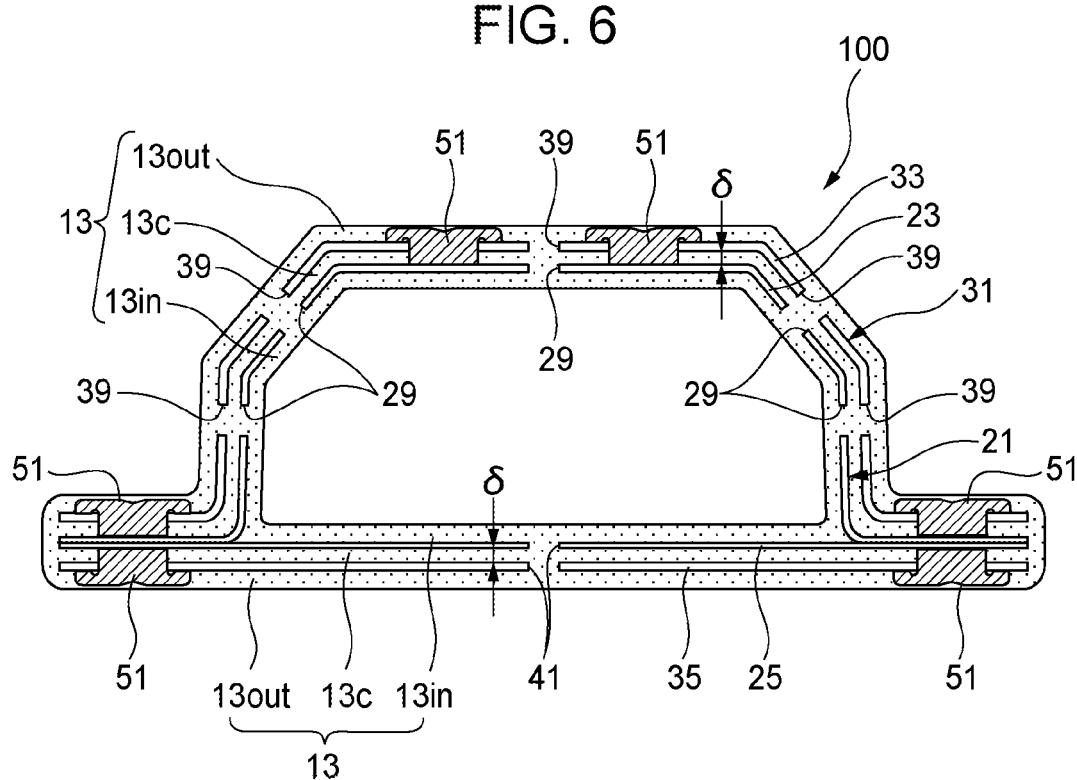
FIG. 6 is a cross-sectional view taken along line VI-VI in FIG. 5.

FIG. 5 is a perspective view of the joining structure after the resin-molding process. FIG. 6 is a cross-sectional view taken along line VI-VI in FIG. 5.

A joining structure 100 after the resin-molding process has a resin section 13 formed in the overlapping region W. As shown in FIG. 6, the resin section 13 has intermediate resin 13c between the first member 21 and the second member 31, inner resin 13in provided on the surface of the first member 21 at the opposite side from a surface facing the second member 31, and outer resin 13out provided on a surface of the second member 31 at the opposite side from a surface facing the first member 21.

The resin section 13 in this configuration may at least include the intermediate resin 13c to be injected into a separation space between the first member 21 and the second member 31. With the intermediate resin 13c, the first member 21 and the second member 31 are joined together into a single unit. Furthermore, the resin section 13 preferably includes the inner resin 13in on the inner surface of the first member 21 and the outer resin 13out on the outer surface of the second member 31.

The injector-molded resin also fills the through-holes 29 and 39 and the resin feed holes 41. The resin filling the through-holes 29 and 39 and the resin feed holes 41 engages with the first member 21 and the second member 31 so as to become unlikely to fall out from the holes. Furthermore, because the intermediate resin 13c, the outer resin 13out, and the inner resin 13in are connected to one another by the resin filling the through-holes 29 and 39 and the resin feed holes 41, the entire resin section 13 is made into a single unit. Due to these effects, the rigidity of the joining structure 100 can be increased without increasing its weight. Moreover, the load bearing properties of the joining structure 100 can also be enhanced.

The inner resin 13in covers an end surface of one end (i.e., the one end 21a in FIG. 3) of the first panel member 23 and the first base plate member 25, and the outer resin 13out covers an end surface of one end (i.e., the one end 31a in FIG. 3) of the second panel member 33 and the second base plate member 35. Accordingly, the end surfaces are protected from immersion of moisture by the inner resin 13in and the outer resin 13out, thereby reducing the occurrences of rust, corrosion, and electrolytic corrosion.

At least the surface of the overlapping region W between the first member 21 and the second member 31 may either be a smooth surface or a roughened surface. In a case where the surface of the overlapping region W is roughened, the joining strength with the resin can be further increased. Furthermore, at least the overlapping region W between the first member 21 and the second member 31 may be embossed. The resin is injected into gaps in the embossed surface so that the first member 21 and the second member 31 can be joined with enhanced load bearing properties in the longitudinal direction. Moreover, the surface of at least one of the first member 21 and the second member 31 may be given primer treatment prior to the above-described process for injection-molding the resin.

Primer treatment involves forming a primer layer on the surface of the first member 21 or the second member 31 by applying an adhesive thereto. The adhesive used for the primer treatment may be a low-viscosity liquid with small nonvolatile content, such as a modified-polyolefin-based coating or a modified-epoxy-based primer. The primer layer has an effect for increasing the adhesiveness of the surfaces of the members 21 and 31 and contributes to higher adhesive strength between the members 21 and 31 and the resin. Furthermore, with the primer treatment, the first member 21 and the second member 31 can be electrically insulated form each other.

The resin material constituting the resin section 13 is not particularly limited so long as it is resin composition used in normal injection-molding. For example, thermoplastic resin, such as propylene (PP), polyamide, polyethylene, polysytrene, ABS resin, vinyl chloride resin, or fluorine resin, may be used.

The resin material may be mixed with a filler, such as talc or metallic fiber, and various types of additives. In that case, the filling factor of the filler in the resin is preferably about 5% to 40% (5% to 20% in the case of metallic fiber) for increasing the strength of the resin while ensuring the flowability of the resin during injection-molding.

With regard to the resin section 13 in this configuration, since the resin is injected at high pressure by injection-molding, the filling density of the resin becomes high. Thus, gaps that allow immersion of moisture, which may cause rust, corrosion, and electrolytic corrosion to occur, are not formed between the first member 21 and the second member 31.

The thickness of the intermediate resin 13c filling the separation space between the first member 21 and the second member 31 is preferably about 1.8 mm to 3 mm in the thinnest area in view of the flowability of the resin during injection-molding and the strength of the metal-resin composite member. The thickness of the intermediate resin 13c is determined by the separation distance δ formed between the first member 21 and the second member 31 by the rivets 51 prior to the injection-molding process.

The thickness of the outer resin 13out is determined by the separation distance formed between the inner peripheral surface of the resin-molding mold and the second member 31. The thickness of the inner resin 13in is determined by the separation distance formed between the outer peripheral surface of the core to be inserted in the Y direction and the first member 21.

In the joining structure 100 according to this configuration example described above, the first member 21 and the second member 31 are disposed with the separation distance δ therebetween by the separation means. The intermediate resin 13c is injected into this separation space by injection-molding so that the first member and the second member 31 are joined together via the intermediate resin 13c. Therefore, even if the first member 21 and the second member 31 are dissimilar metallic materials composed of different materials, such as a combination of steel and aluminum, intermetallic compounds are not produced at the joint interfaces, whereby the two members can be securely joined without deterioration. Furthermore, immersion of moisture to the interface among the first member 21, the second member 31, and the resin section 13 does not occur, so that rust, corrosion, and electrolytic corrosion are prevented from occurring.

When injecting the resin by injection-molding, the first member 21 and the second member 31 can be joined together in a single injection-molding step, thereby simplifying the manufacturing process. Moreover, with the resin becoming solidified after being injection-molded, the resin section 13 is formed without any gaps in the joint surface between the first member 21 and the second member 31. Therefore, immersion of moisture through the joint interfaces does not occur, and the resin does not delaminate like a sealant. Moreover, this configuration achieves increased durability and prevents gaps from forming in the joint interfaces even after an extended period of use, as compared with a configuration in which the first member 21 and the second member 31 are separately fabricated and are subsequently fastened and joined together via resin.

Furthermore, the inner resin 13in and the outer resin 13out are formed, by injection-molding, on the surfaces opposite from the surfaces where the first member 21 and the second member 31 face each other. Therefore, the resin section 13 is formed over the entire overlapping region W between the first member 21 and the second member 31. Thus, the interface between the first member 21 and the resin section 13 and the interface between the second member 31 and the resin section 13, including the end surfaces of the first member 21 and the second member 31, are protected, and the reinforcement effect is also enhanced.

Furthermore, at least one of the first member 21 and the second member 31 is provided with at least one through-hole 29 or 39 to be filled with resin. By filling the through-holes 29 and 39 with resin, the resin section 13 (i.e., the intermediate resin 13e, the outer resin 13out, and the inner resin 13in) covering the first member 21 and the second member 31 is combined with the resin in the through-holes 29 and 39, so that the rigidity of the joining structure 100 is increased.

By changing the size of the rivets 51 to be used, the separation distance between the first member 21 and the second member 31 can be freely and precisely adjusted. Moreover, by adjusting the separation distance δ over the entire overlapping region W or by locally adjusting the separation distance δ, uneven flew of resin can be prevented during injection-molding. As a result, a lack of flow of resin is avoided so that the occurrence of an injection-molding defect is prevented, whereby the joining strength between the first member 21 and the second member 31 can be further increased.

Because the first member 22 and the second member 31 are not to come into contact with each other, electrolytic corrosion can be prevented from occurring even when dissimilar metallic materials having electric potentials different from each other, such as steel and aluminum, are used. Thus, the options for the joining materials are broadened, thereby achieving a higher degree of design freedom. Moreover, aluminum, which is inexpensive, can be used, so that the joining structure 100 can be reduced in cost and weight.

The first member 21 and the second member 31 that constitute the frame member 11 are not limited to steel and aluminum, and other types of metal may be used so long as at least one of the members is composed of a metallic material. Moreover, a combination of members composed of the same material but with different thicknesses is also permissible.

Examples of the metallic material that can be used include an aluminum alloy material (such as JIS 6000-series, 5000-series, 7000-series, 2000-series, or 3000-series), a magnesium alloy, steel (soft steel or high-tensile steel), a titanium alloy, and a combination of these materials.

Of the first member 21 and the second member 31, the member to which the rivets 51 are to be clinched may be composed of a nonmetallic material, such as carbon fiber reinforced plastic (CFRP). Other examples of the nonmetallic material include glass fiber reinforced plastic (GFRP), glass-mat reinforced thermoplastic (GMT), boron fiber reinforced plastic (BFRP), aramid fiber reinforced plastic (AFRP, KFRP), polyethylene fiber reinforced plastic (DFRP), and Zylon fiber reinforced plastic (ZFRP).

Although the above description relates to an example in which plates are used as the first member 21 and the second member 31 in this configuration, a cast material may be used as an alternative to a wrought material, such as a shaped material or a forged material. Moreover, the first member 21 and the second member 31 may be a joining structure formed by joining tabular press-formed products by, for example, welding.

The through-holes 29 and 39 and the resin feed holes 41 are not limited to the circular holes shown in the drawings, and may be holes with a freely-chosen shape, such as square holes or slotted holes. Furthermore, as an alternative to the cylindrical shape, the cross-sectional shape of each hole may be a shape with an increasing inner surface area or a shape having an inclined surface, such as a tapered shape or a shape in which an intermediate section in the thickness direction protrudes inward. In that case, the joining strength between the inner wall surface of each hole and the resin further increases, so that the rigidity of the joining structure 100 can be further increased.

Second Configuration Example of Joining Structure

Figure 7:
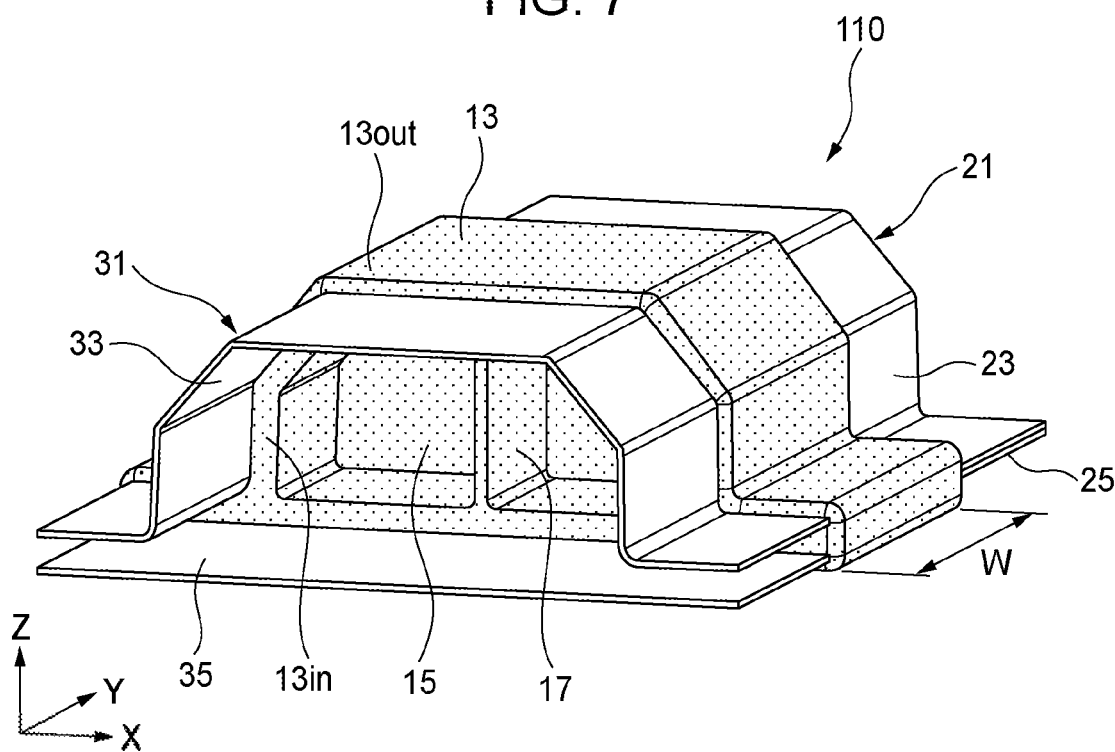
FIG. 7 is a perspective view illustrating a second configuration example of a joining structure.

Next, a joining structure according to a second configuration example will be described with reference to FIG. 7. A joining structure 110 according to this configuration example is similar to the joining structure 100 according to the first configuration example except that the inner resin 13in formed on the inner surface of the first member is provided with ribs. Therefore, identical members and identical sections will be given the same reference signs, and descriptions thereof will be simplified or omitted. Likewise, in each of the following configuration examples, descriptions of identical members and identical sections will be simplified or omitted.

In the joining structure 110 according to this configuration example, the inner resin 13in formed on the inner surface of the first member 21 has walls 15 and 17 that connect between the base formed along the first base plate member 25 and the top formed along the top surface of the first panel member 23.

The wall 15 is formed in the width direction (i.e., X direction) orthogonal to the longitudinal direction (i.e., Y direction) of the joining structure 110. The wall 17 is formed in the longitudinal direction (i.e., Y direction) of the joining structure 100. These walls 15 and 17 constitutes ribs serving as reinforcement sections and reinforce the compressive strength and the torsional strength of the joining structure 110. Consequently, the rigidity of the entire joining structure 110 is further increased.

Figure 8:
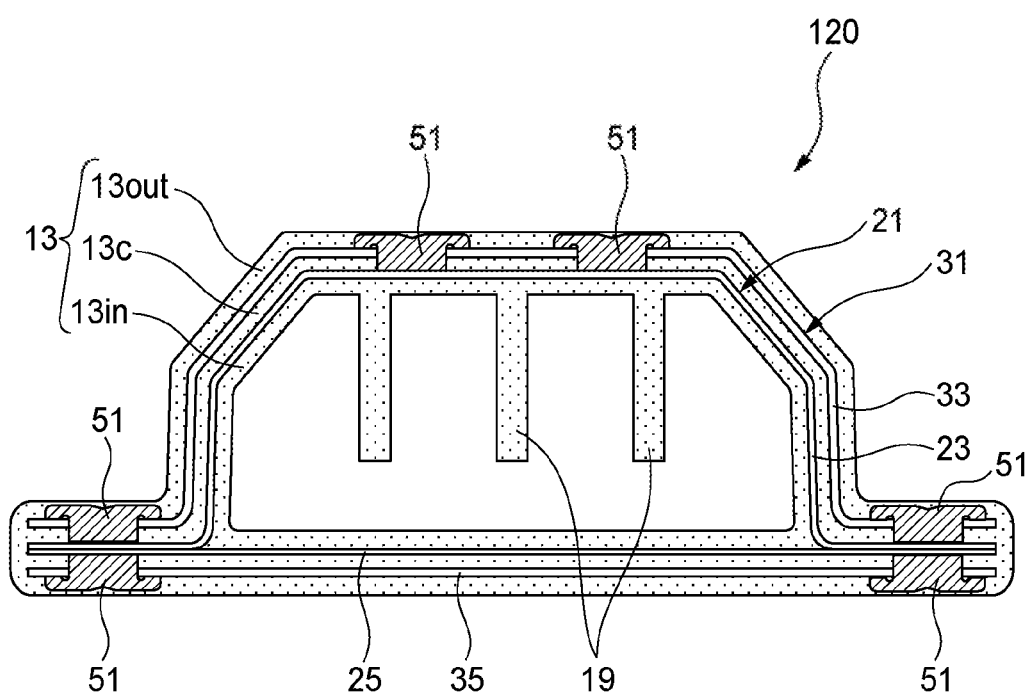
FIG. 8 is a cross-sectional view illustrating a modification of the joining structure.

FIG. 8 is a cross-sectional view of a joining structure 120 as a modification of the second configuration example. The ribs in this modification are constituted by a plurality of walls 19 that protrude toward the inner side of the first member 21 from the inner resin 13in formed on the inner surface of the first panel member 23. Even though the walls 19 are not connected to the base extending along the first base plate member 25, they can still increase the rigidity of the joining structure 110.

In the joining structure 110 according to the second configuration example and the joining structure 120 according to the modification, the resin section 13 covering the first member 21 and the second member 31 is provided with the reinforcement sections formed on the walls 15, 17, and 19 constituting the ribs, so that the rigidity of the joining structure 100 can be increased without significantly increasing the weight of the joining members. The shape and position of the reinforcement sections can be arbitrarily set in accordance with the load acting on the joining structure 100. Moreover, the ribs may be provided on the outer resin 13out instead of the inner resin 13in. Even in that case, advantages similar to those described above can still be achieved.

Third Configuration Example of Joining Structure

Next, a joining structure according to a third configuration example will be described with reference to FIGS. 9 and 10.

Figure 9:
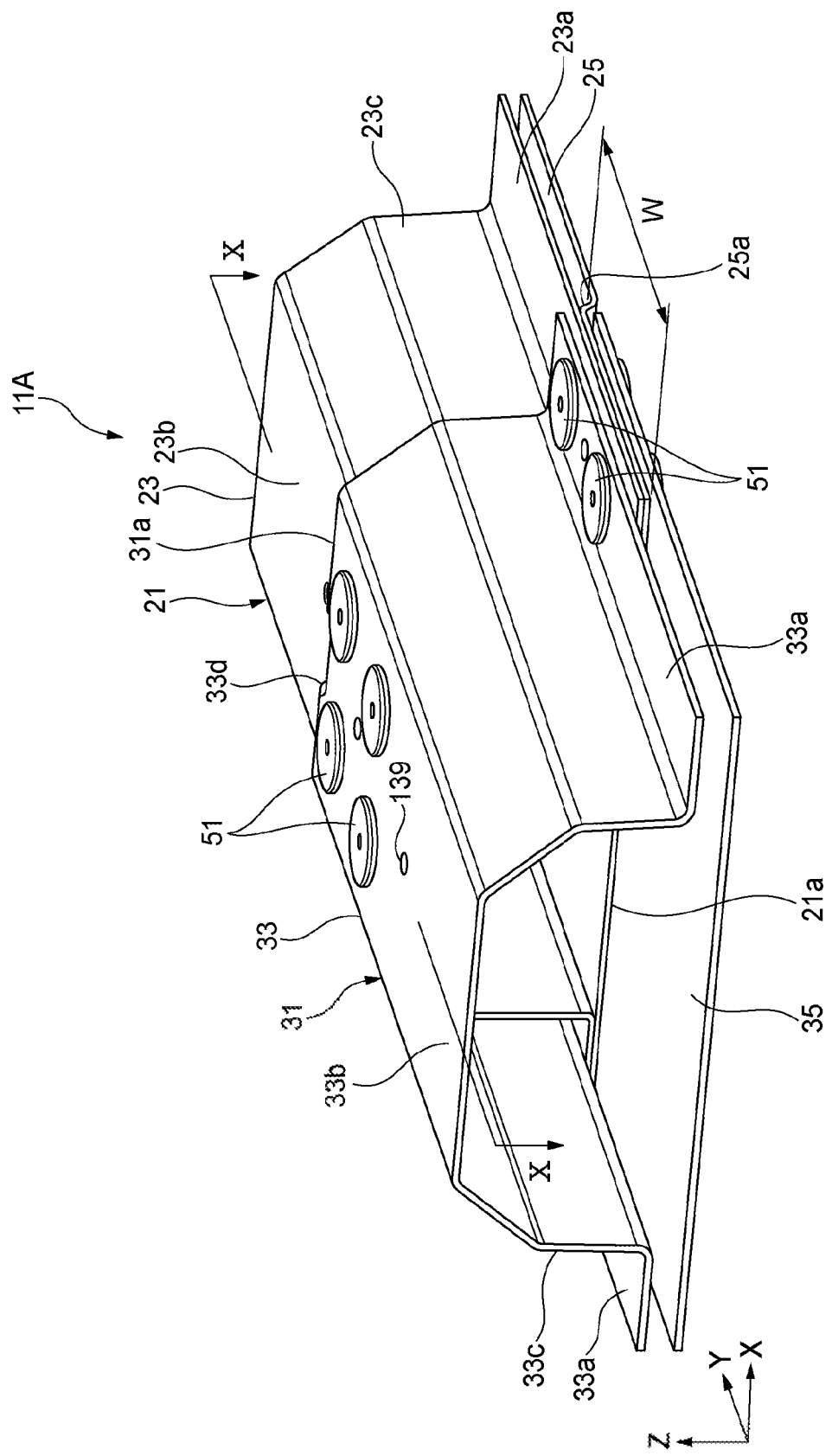
FIG. 9 is a perspective view illustrating a frame member of a joining structure according to a third configuration example before a resin molding process.
Figure 10:
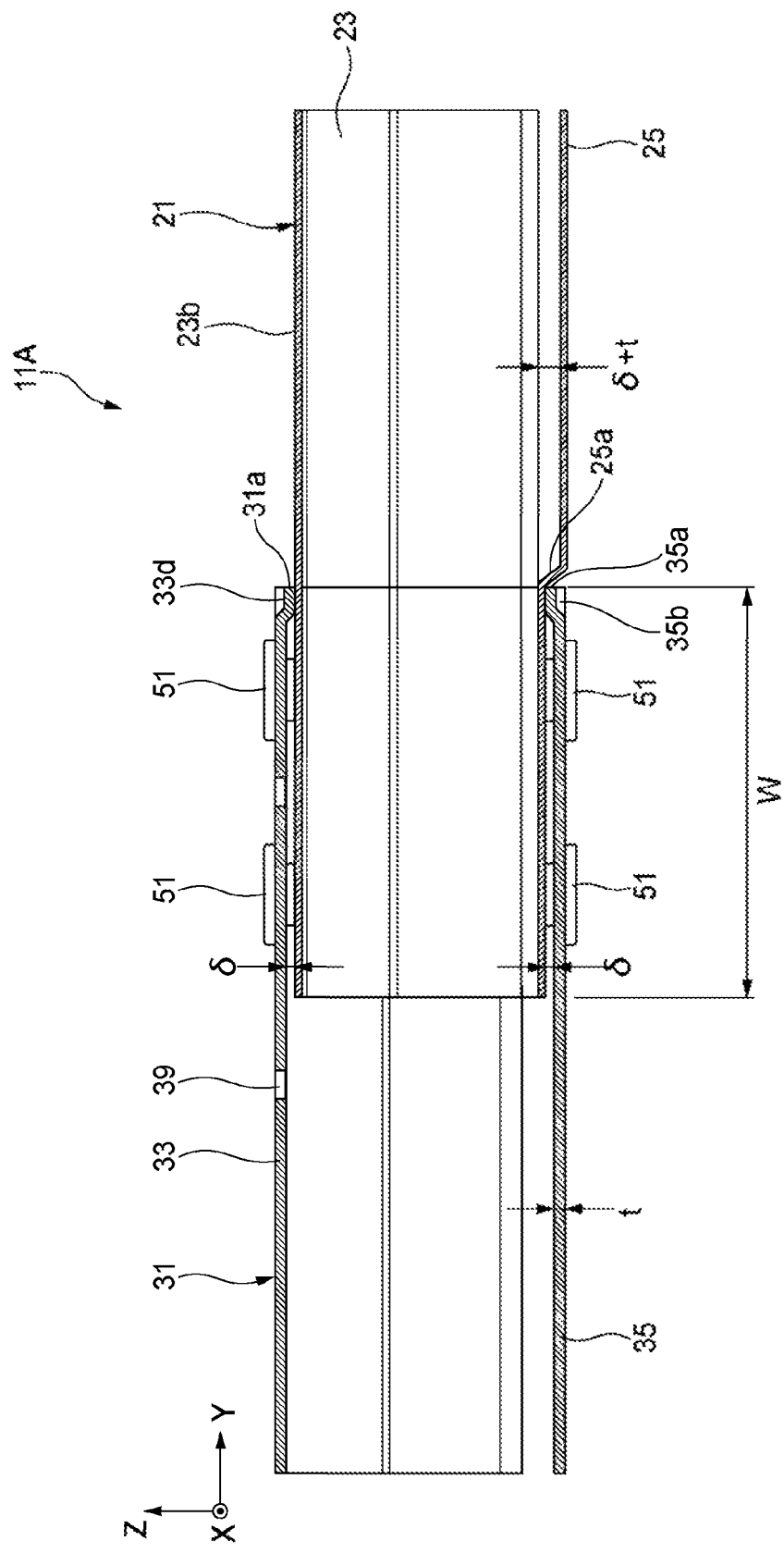
FIG. 10 is a cross-sectional view taken along line X-X in FIG. 9.

FIG. 9 is a perspective view illustrating a frame member of the joining structure according to the third configuration example before a resin molding process. FIG. 10 is a cross-sectional view taken along line X-X in FIG. 9.

The joining structure according to this configuration example is similar to that according to the first configuration example except that the shape outside the overlapping region W of the first member 21 is different from that in the joining structure 100 according to the first configuration example.

The first base plate member 25 in this configuration has a step section 25a that is distant from the one end 21a by the length of the overlapping region W in the longitudinal direction (i.e., Y direction) and that is separated from the flanges 23a of the first panel member 23.

The step section 25a has a step with a height obtained by adding a thickness t of the second base plate member 35 to the separation distance δ between the first base plate member 25 and the second base plate member 35 in the overlapping region W. With this step section 25a, the first base plate member 25 outside the overlapping region W and the second base plate member 35 are disposed within the same plane.

According to the joining structure that uses a frame member 11A in this configuration, the base of the first base plate member 25 and the base of the second base plate member 35 are flush with each other. Therefore, it is not necessary to use an additional component for height adjustment when attaching to, for example, a mechanical device, so that the attachment structure can be simplified.

Furthermore, the one end 31a of the second panel member 33 constituting the second member 31 may have a protrusion 33d that protrudes toward the top surface 23b of the first panel member 23 constituting the first member 21. The protrusion 33d comes into contact with the top surface 23b of the first panel member 23 so that the first panel member 23 and the second panel member 33 in the overlapping region W can be reliably separated from each other by the separation distance δ even at the ends.

Furthermore, one end 35a of the second base plate member 35 constituting the second member 31 may also have a protrusion 35b that protrudes by an amount equivalent to the separation distance δ. The protrusion 35b comes into contact with the boundary with the step section 25a to the overlapping region W of the first base plate member 25, so that the first base plate member 25 and the second base plate member 35 can be reliably separated from each other by the separation distance δ even at the ends.

At least one of the joint surface between the protrusion 33d and the first member 21 and the joint surface between the protrusion 35b and the first member 21 is insulated with, for example, a primer layer, thus preventing rust, corrosion, and electrolytic corrosion from occurring.

The protrusions 33d and 35b may be provided at freely-chosen sites within the overlapping region W in addition to the aforementioned sites. For example, the protrusions may be provided selectively at sites where it is desirable to reliably provide the separation distance δ, or may be provided in the entire overlapping region W.

The protrusions 33d and 35b may have freely-chosen shapes, such as a dot-shape, a linear shape, or a curved shape. By adjusting the length and the orientation, the direction in which the resin flows during injection-molding can be controlled to a desired direction. Accordingly, the resin can be made to actively flow to a region with small flow of resin, thereby preventing the occurrence of an injection-molding defect, such as a void area.

Fourth Configuration Example of Joining Structure

Next, a joining structure according a fourth configuration example will be described. In this configuration example, the joining structure is applied to a sub-frame of a vehicle.

Figure 11:
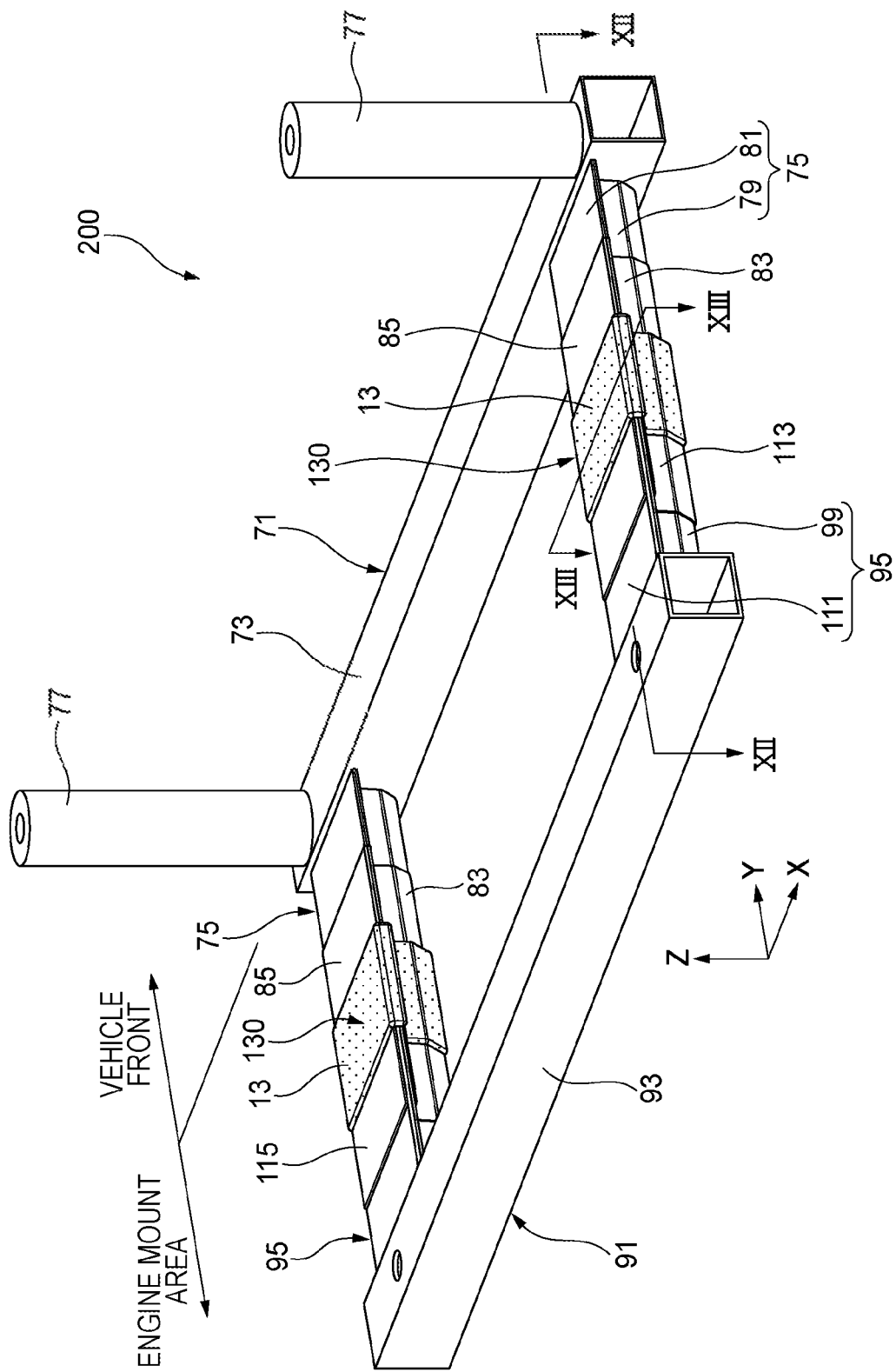
FIG. 11 is a perspective view illustrating a fourth configuration example of a joining structure.
Figure 12:
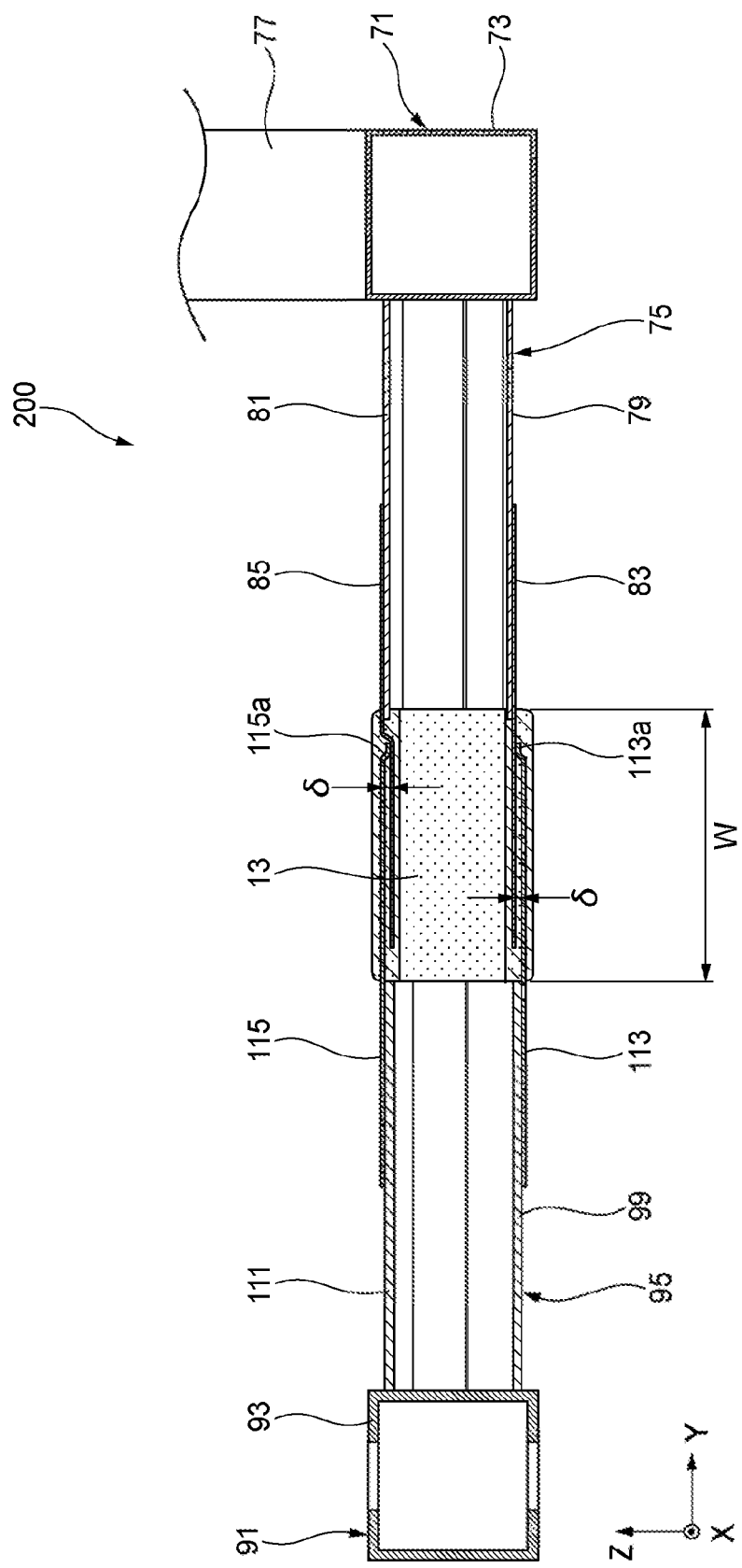
FIG. 12 is a cross-sectional view taken along line XII-XII in FIG. 11.
Figure 13:
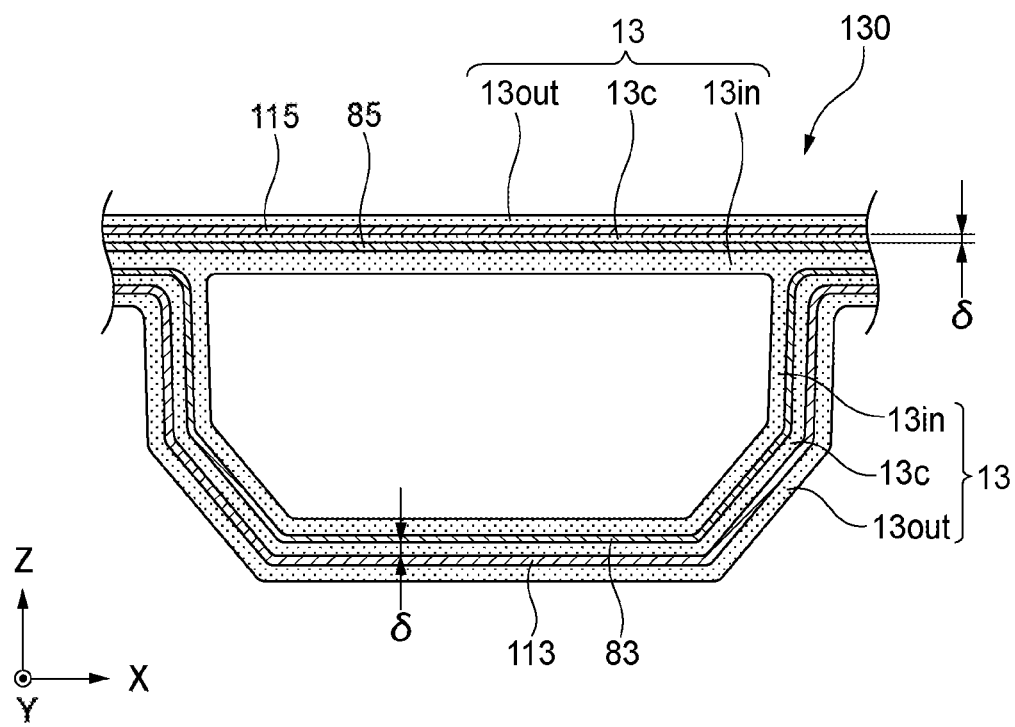
FIG. 13 is a cross-sectional view taken along line XIII-XIII in FIG. 11.

FIG. 11 is a perspective view illustrating the fourth configuration example of the joining structure. FIG. 12 is a cross-sectional view taken along line XII-XII in FIG. 11. FIG. 13 is a cross-sectional view taken along line XIII-XIII in FIG. 11.

As shown in FIG. 11, a sub-frame 200 is one of frame structures of a vehicle and has a shape in which a steel front member 71 disposed at the front of the vehicle and an aluminum rear member 91 to which, for example, an engine is to be mounted are joined together by joining structures 130.

The front member 71 includes a front cross member 73 extending in the vehicle width direction (i.e., X direction), a pair of front side members 75, and a pair of columns 77. The pair of front side members 75 extend toward the rear of the vehicle from opposite ends of the front cross member 73 in the vehicle width direction (i.e., X direction). The pair of columns 77 extend upward from the opposite ends of the front cross member 73 in the vehicle width direction (i.e., X direction).

The pair of front side members 75 each have a flanged front panel member 79 and a tabular front top-plate member 81.

The rear member 91 includes a rear cross member 93 extending in the vehicle width direction (i.e., X direction) and a pair of rear side members 95 extending toward the front of the vehicle from opposite ends of the rear cross member 93 in the vehicle width direction (i.e., X direction). Similar to the front side members 75, the pair of rear members 95 each have a flanged rear panel member 99 and a tabular rear top-plate member 111.

As shown in FIG. 12, the front panel member 79 and the front top-plate member 81 constituting each of the front side members 75 have steel front auxiliary members 83 and 85 integrally connected by, for example welding to the distal ends opposite from the font cross member 73. The front auxiliary members 83 and 85 extend toward the rear of the vehicle from the distal ends of the front panel member 79 and the front top-plate member 81, respectively. These front auxiliary members 83 and 85 have cross-sectional shapes analogous to those of the front panel member 79 and the front top-plate member 81.

Furthermore, aluminum rear a axillary members 113 and 115 are integrally connected by for example, welding to the distal ends, opposite from the rear member 91, of the rear panel member 99 and the rear top-plate member 111 constituting each of the rear side members 95. The rear auxiliary members 113 and 115 extend toward the from of the vehicle. These rear auxiliary members 113 and 115 have cross-sectional shapes analogous to those of the rear panel member 99 and the rear top-plate member 111.

The front panel member 79 and the front top-plate member 81, as well as the front auxiliary members 83 and 85, are both composed of steel. The rear panel member 99 and the rear top member 111, as well as the rear auxiliary members 113 and 115, are both composed of aluminum. Therefore, the front auxiliary members 83 and 85 can be securely and readily joined to the front side members 75 composed of the same material by, for example, welding. Likewise, the rear auxiliary members 113 and 115 can be securely and readily joined to the rear side members 95 composed of the same material by, for example, welding.

The front auxiliary members 83 and 85 and the rear auxiliary members 113 and 115 function as auxiliary members for joining the front side member 75 and the rear side members 95. A distal edge 113a of the rear auxiliary member 113 is in contact with the outer surface of the front auxiliary member 83. As shown in FIG. 13 is an enlarged view, the front auxiliary member 83 and the rear auxiliary member 113 overlap each other in the thickness direction with the separation distance δ therebetween. A distal edge 115a of the rear auxiliary member 115 is in contact with the outer surface of the front auxiliary member 85. The front auxiliary member 85 and the rear auxiliary member 115 overlap each other in the thickness direction of the members with the separation distance δ therebetween.

The joint section between the front auxiliary member 83 and the distal edge 113a and the joint section between the front auxiliary member 85 and the distal edge 115a are insulated with primer layers.

As described above in the first configuration example, the resin section 13 is formed by injection-molding in the overlapping region W where the front auxiliary members 83 and 85 and the rear auxiliary members 113 and 115 overlap. The inner and outer surfaces in the overlapping region W between the front auxiliary members 83 and 85 and the rear auxiliary members 113 and 115 are entirely covered with the resin formed by injection-molding, and the resin is also formed in the separation space between the front auxiliary member 83 and the rear auxiliary member 113 and in the separation space between the front auxiliary member 85 and the rear auxiliary member 115.

Accordingly, components composed of different materials can be securely joined to each other without producing intermetallic compounds in the joint sections between the steel front auxiliary members 83 and 85 and the aluminum rear auxiliary members 113 and 115. Moreover, because the rear member 91 is composed of aluminum, the sub-frame 200 is reduced in weight, thus contributing to, for example, improved fuel efficiency of the vehicle.

Figure 14A:
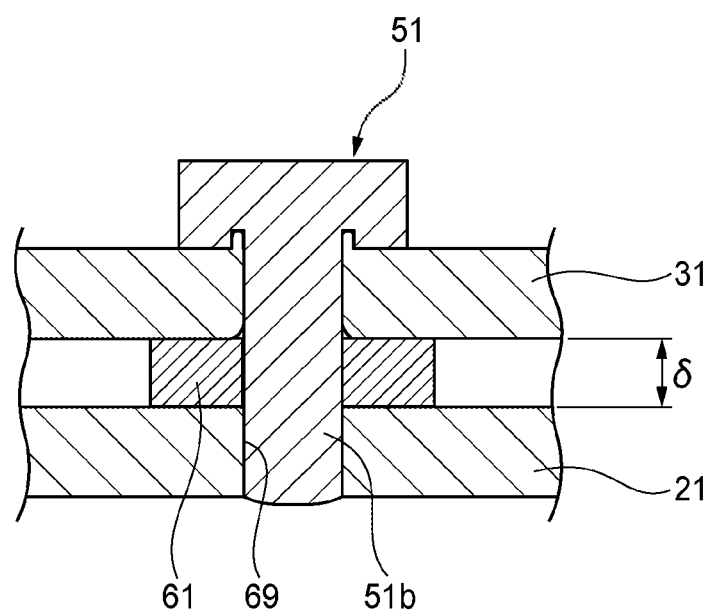
FIG. 14 is a cross-sectional view of a relevant part, illustrating a state where a first member and a second member are fixed to each other with a spacer interposed therebetween.
FIG. 14B is a cross-sectional view of a relevant part, illustrating a state where the first member and the second member are fixed to each other with a washer interposed therebetween.

As shown in FIG. 14A, the first member 21 and the second member 31 may be fixed to each other with the rivets 51 in a state where spacers 61 having a thickness corresponding to the aforementioned separation distance δ are interposed between the first member 21 and the second member 31. As an alternative to welding each rivet 51 to the first member after bringing the distal end 51c thereof into contact with the first member, as shown in FIG. 4, the rivet 51 may be, for example, welded to the first member after forming a pilot hole 69 in the first member and inserting the shank 51b through the pilot hole 69.

Figure 14B:
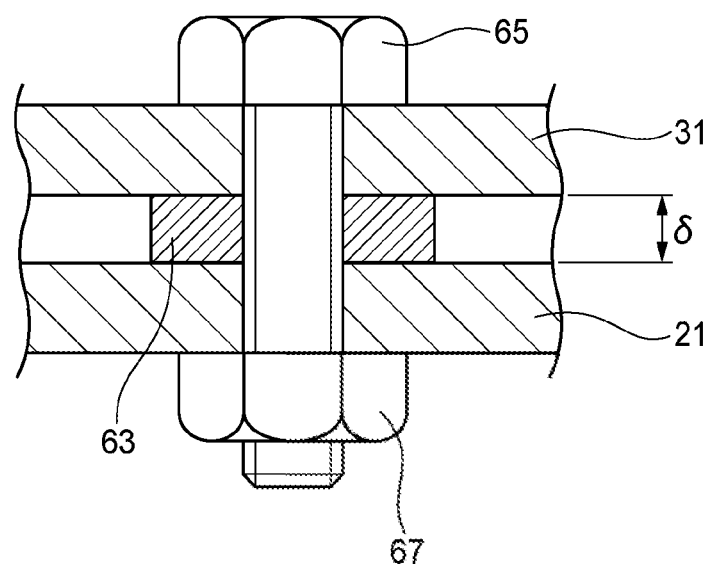

Furthermore, as shown in FIG. 14B, the first member 21 and the second member 31 may be fastened to each other by using bolts 65 and nuts 67 in a state where washers 63 having a thickness corresponding to the aforementioned separation distance δ are interposed between the two members. In that case, it is preferable that the bolts 65 be extended through the washers 63 before injection-molding.

Figure 15:
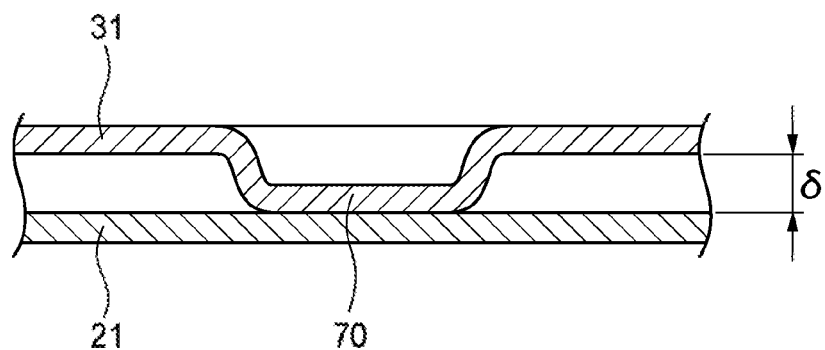
FIG. 15 is an enlarged cross-sectional view of a relevant part, illustrating a state where the first member and the second member are separated from each other by a protrusion.

Moreover, as shown in FIG. 15, similar to the protrusions 33d and 35b (see FIG. 10) indicated in the third configuration example, at least one of the first member 21 and the second member 31 may be provided with a protrusion 70 that protrudes from one of the members toward the other (the protrusion 70 is provided at the second member 31 side in the drawing). By giving the protrusion 70 a protruding height equivalent to the desired separation distance δ, the first member 21 and the second member 31 can be readily separated from each other by the desired separation distance δ.

By forming the protrusion 70 simultaneously with press-forming of the first member 21 or the second member 31, the manufacturing process is prevented from becoming complicated. Moreover, since a component configured separately from the first member 21 and the second member 31 is not used, the first member 21 and the second member 31 can be separated from each other by the desired separation distance δ at low cost. The contact surface between the protrusion 70 and the first panel member 23 may be provided with an insulation layer, such as a primer layer.

Accordingly, the desired separation distance δ is achieved by the protrusion 70, so that it is not necessary to use additional components like the rivets 51, thereby achieving by using both the protrusion 70 and the rivets 51. In that case, supposing that the protrusion 70 is crushed, the separated state between the first member 21 and the second member 31 can still be reliably maintained. Moreover, by increasing the number of installed protrusions 70, moment of inertia of area increases, so that the rigidity of the members can be increased.

Figure 16:
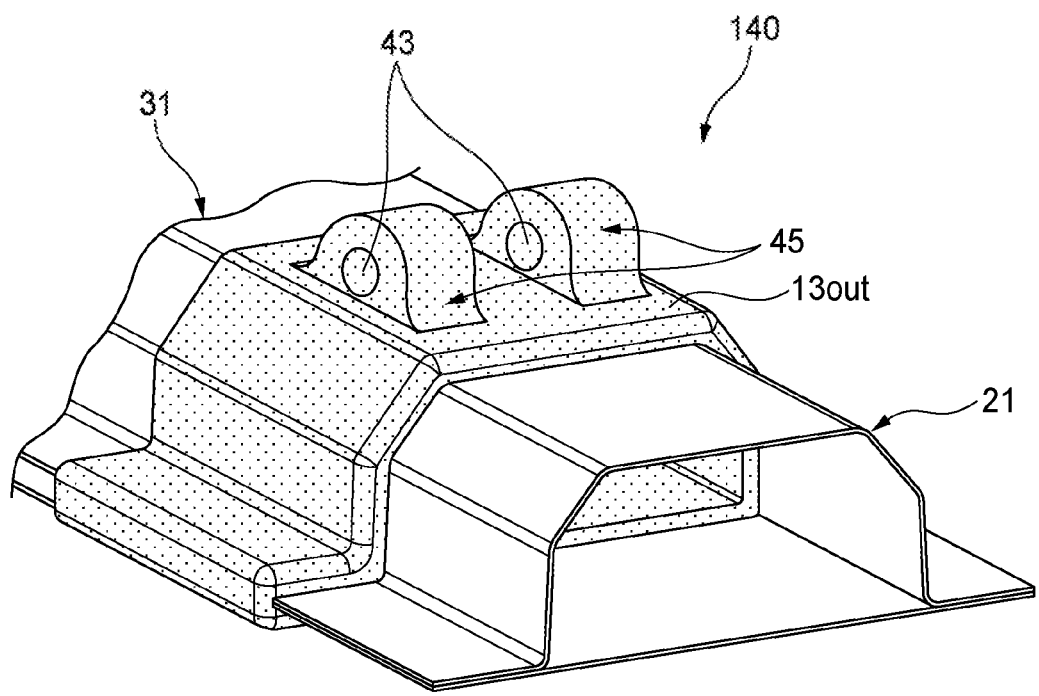
FIG. 16 is a perspective view of a joining structure in which resin that covers a member is integrally provided with a coupling section to be coupled to another component.

Furthermore, as shown in FIG. 16, when injection-molding the resin, a coupling section 45 that protrudes outward from the surface of the resin and is to be coupled to another component may be integrally formed on a part of the outer resin 13out to be formed on the outer surface of the second member 31. The coupling section 45 is provided with attachment holes 43 so that a joining structure 140 can be readily attached to another component. In addition, the coupling section 45 serves as a reinforcement section for reinforcing the outer resin 13out, so that the rigidity of the joining structure can be increased.

Although each of the above-described configurations relates to a laminated structure constituted of two members, namely, the first member and the second member, a multi-layer structure having an additional strength member further laminated thereon is also permissible.

Next, a composite frame member will be described as another example of a joining structure. In this case, for example, a vehicle component frame used as, for example, a roof cross member or a roof side pillar will be described as a composite frame member.

First Configuration Example of Composite Frame Member

Figure 17:
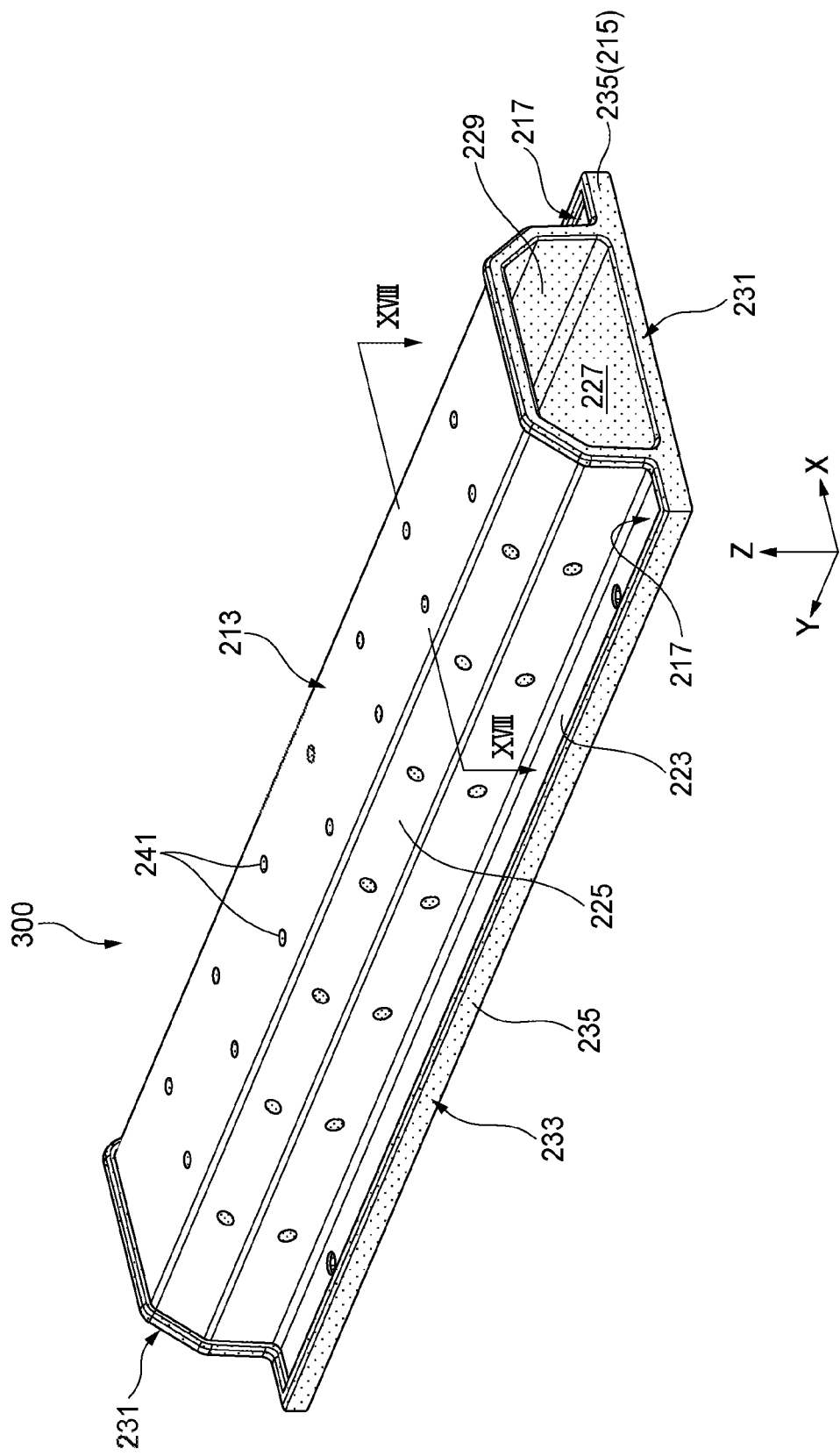
FIG. 17 is a diagram for explaining an embodiment of the present invention and is perspective view illustrating a first configuration example of a composite frame member.
Figure 18:
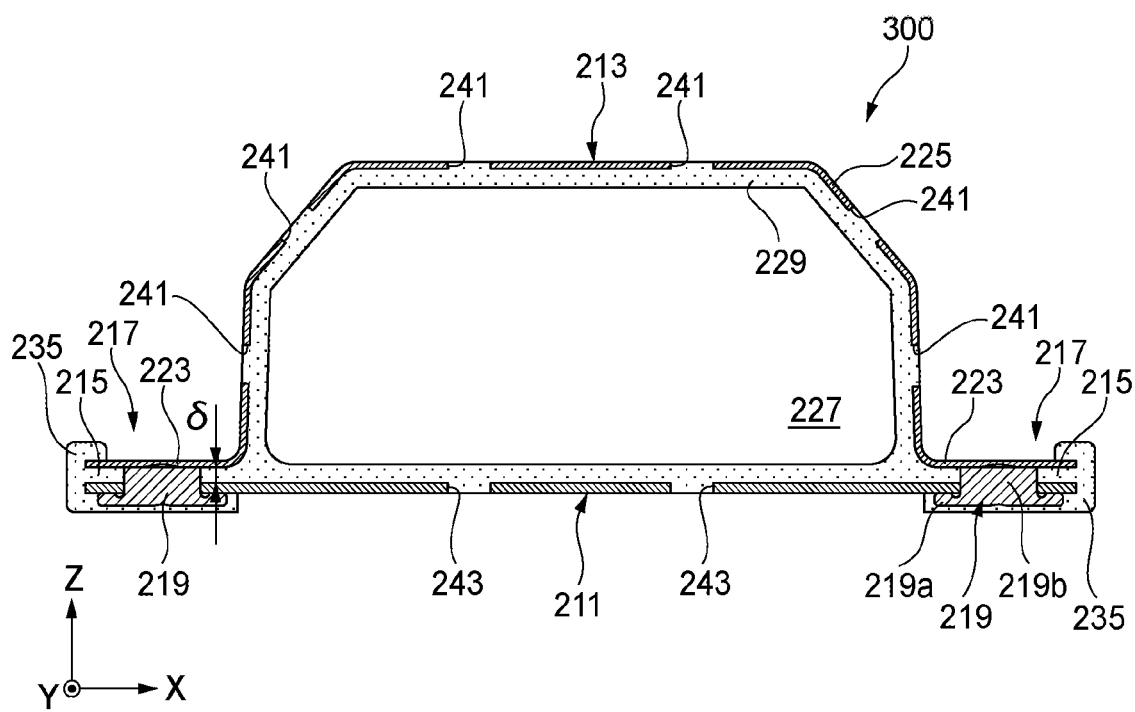
FIG. 18 is a cross-sectional view of the composite frame member shown in FIG. 17, taken along line XVIII-XVIII.
Figure 19:
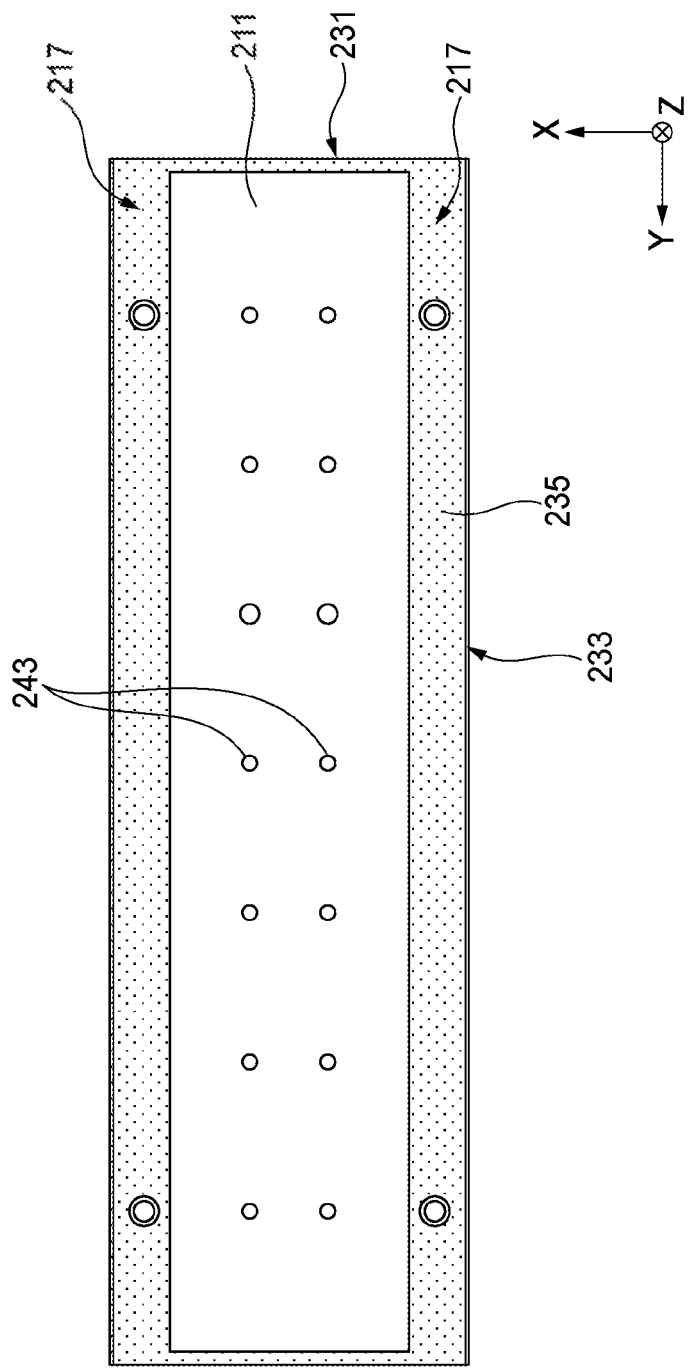
FIG. 19 is a bottom view illustrating the bottom side of the composite frame member shown in FIG. 17.

FIG. 17 is a diagram for explaining an embodiment of the present invention and is a perspective view illustrating a first configuration example of a composite frame member. FIG. 18 is a cross-sectional view of a composite frame member 300 shown in FIG. 17, taken along line XVIII-XVIII. FIG. 19 is a bottom view illustrating the bottom side of the composite frame member 300 shown in FIG. 17.

As shown in FIGS. 17 and 18, the composite frame member 300 has a base plate member (first member) 211 (see FIG. 18) formed of a steel plate extending in the longitudinal direction and a panel member (second member) 213 formed of an aluminum plate extending in the longitudinal direction, and at least a part between the two members is joined by resin.

The base plate member 211 and the panel member 213 are disposed such that the longitudinal directions (i.e., Y directions) thereof is aligned. The composite frame member 300 has overlap sections 217 at opposite ends thereof in the frame width direction (i.e., X direction) orthogonal to the longitudinal direction. In the overlap sections 217, the base plate member 211 and the panel member 213 are disposed with a separation distance δ therebetween in an overlapping manner in the thickness direction of the members.

As shown in FIG. 18, the panel member 213 has flat flanges 223 at the opposite ends in the frame width direction (i.e., X direction) and a bulging section 225 that extends from the flanges 223 and protrudes outward in the overlapping direction (i.e., Z direction) relative to the base plate member 211. As shown in FIG. 19, the base plate member 211 is entirely flat. This base plate member 211 is disposed to overlap the flanges 223 of the panel member 213 in the thickness direction with the separation distance δ therebetween.

The panel member 213 and the base plate member 211 are joined at the overlap sections 217 in the flanges 223 by using rivets (separation means) 219. In each overlap section 217, a separation space corresponding to the separation distance δ in the overlapping direction (i.e., Z direction) is formed between the panel member 213 and the base plate member 211. Resin is injected into at least the separation spaces of the overlap sections 217 by injection-molding, which will be described later. Moreover, the resin may be formed on, for example, the inner surface of a hollow space 227 surrounded by the bulging section 225 of the panel member 213 and by the base plate member 211.

The panel member 213 and the base plate member 211 are joined together via resin including intermediate resin 215 formed by injection-molding, thereby constituting the composite frame member 300.

The separation distance δ formed as a result of separation between the panel member 213 and the base plate member 211 is preferably set to about 1.8 mm to 3 mm in the thinnest area in view of the flowability of the resin during injection-molding and the strength of the metal-resin composite member. The dimension of the separation distance δ is determined, as appropriate, in accordance with, for example, the flowability of the resin during injection-molding, which will be described later, and the strength of the metal-resin composite member.

Furthermore, similar to the above-described case of the rivets 51 shown in FIG. 4, a uniform separation distance δ is set between the base plate member 211 and the panel member 213 in this configuration.

In the composite frame member 300 having this configuration, joint sites according to the rivets 219 are provided at a plurality of locations in the longitudinal direction (i.e., Y direction) of the overlap sections 217. Accordingly, the separation distance δ in the overlap sections 221 between the panel member 213 and the base plate member 211 is made uniform with high accuracy.

In the middle of the composite frame member 300 in the frame width direction (i.e., X direction) relative to the overlap sections 217, a hollow space 27 is defined by the building section 225 of the panel member 213 and by the base plate member 211. Furthermore, the panel member 213 and the base plate member 211 are joined by the intermediate resin 215 at the flanges 223. Specifically, the cross section of the composite frame member 300 orthogonal to the longitudinal direction (i.e., Y direction) thereof has a closed cross-sectional shape.

As shown in FIGS. 17 to 19, the panel member 213 and the base plate member 211 have a plurality of through-holes 231 and respectively. At least either of the through-holes 241 and 243 also functions as resin feed holes for feeding resin from a gate (not shown) during injection-molding.

The frame member formed by joining the panel member 213 and the base plate member 211 by using the rivets 219 is set within a resin-molding mold (not shown), and resin is injection-molded into a cavity including the separation spaces of the overlap sections 217.

Although not shown, the resin-molding mold has an outer frame and a core to be inserted into the outer frame. The above-described frame member is set between the inner peripheral surface of the outer frame and the core, and the resin is injected into the cavity. The resin may be injected into the cavity not only through the through-holes 241 and/or 243 serving as resin feed holes, but also from, for example, the longitudinal direction (Y direction) of the frame member.

As shewn to FIG. 18, in the composite frame member 300 after the injection-molding process, the inner surface of the hollow space 227 surrounded by the bulging section 225 of the panel member 213 and by the base plate member 211 is covered with inner resin 229. Specifically, a part that forms the interior of the closed cross-sectional shape defined by the base plate member 211, the panel member 213, and the intermediate resin 215 is covered with resin.

Furthermore, as shown in FIG. 17, outer peripheral edges of the panel member 213 and the base plate member 211, which include lengthwise ends 231 and widthwise ends 233 of the composite frame member 300, are entirely covered with edge resin 235. Accordingly, the end surfaces of the panel member 213 and the base plate member 211 are protected from immersion of moisture, thereby reducing the occurrence of rust, corrosion, and electrolytic corrosion.

In the composite frame member 300, the intermediate resin 215, the inner resin 229, and the edge resin 235 are formed together in a single injection-molding step. Furthermore, with the resin becoming solidified after being injection-molded, the joint interfaces of the resin 215, the resin 229, and the resin 235 relative to the base plate member 211 and the panel member 213 are formed without any gaps. Therefore, immersion of moisture into the composite frame member 300 through the joint interfaces does not occur, and the resin does not delaminate like a sealant.

The injection-molded resin also fills the through-holes 241 and 243. The resin filling the through-holes 241 and 243 engages with the panel member 213 and the base plate member 211 so as to become unlikely to fall out from the holes. Furthermore, the intermediate resin 215, the inner resin 229, and the edge resin 235 are made into a single unit since they are connected to one another by the resin filling the through-holes 241 and 243. Due to these effects, the rigidity of the composite frame member 300 can be increased without increasing its weight.

Similar to the materials used as the first member 21 and the second member 31 shown in FIGS. 1 to 3, appropriate materials may be selected for the base plate member 211 and the panel member 213 constituting the frame member. Moreover, with regard to the resin material, an appropriate material may be selected, similarly to the resin section 13 described above.

Although plates are used as the base plate member 211 and the panel member 213 in this configuration, a cast material may be used as an alternative to a wrought material, such as a shaped material or a forged material. Moreover, the members 211 and 213 may be a joining structure formed by joining tabular press-formed products by, for example, welding.

The surfaces of the base plate member 211 and the panel member 213 may either be smooth surfaces or roughened surfaces. In a case where the surfaces are roughened, the joining strength with the resin can be further increased. Furthermore, the surface of at least one of the base plate member 211 and the panel member 213 may be given primer treatment prior to the above-described process for injection-molding the resin.

According to the composite frame member 300 having the above configuration, the base plate member 211 and the panel member 213 are joined in a state where they are separated from each other at the overlap sections 217 by the separation means, and the intermediate resin 215 is injected into the separation spaces by injection-molding. Accordingly, the base plate member 211 and the panel member 213 are securely joined together via the intermediate resin 215, and the frame rigidity is increased.

Furthermore, the base plate member 211 and the panel member 213 can be joined together in a single injection-molding step, so that the manufacturing process can be simplified. Moreover, this configuration achieves increased durability and prevents gaps from forming in the joint interfaces even after an extended period of use, as compared with a configuration in which the base plate member 211 and the panel member 213 are separately fabricated and are subsequently fastened and joined together via resin.

Furthermore, the resin also fills the through-holes 243 in the base plate member 211 and the through-holes 241 in the panel member 213. Accordingly, the resin (i.e., the intermediate resin 215, the inner resin 229, and the edge resin 235) covering the base plate member 211 and the panel member 213 is combined with the resin filling the through-holes 241 and 243, so that the rigidity of the joining structure 300 is increased. Moreover, the interface between the base plate member 211 and the resin on the panel member 213 becomes less likely to delaminate, so that the load bearing properties and shock resistance of the composite frame member 300 are improved, whereby high frame rigidity is achieved.

Furthermore, because the intermediate resin 215, the inner resin 229, and the edge resin 235 are injected at high pressure by injection-molding, the filling density of the resin becomes high. Thus, gaps are not formed in the joint interfaces of the base plate member 211 and the panel member 213, thereby reliably preventing rust, corrosion, and electrolytic corrosion from occurring due to immersion of water.

By covering the interior of the hollow space 227 and the inner resin 229, the base plate member 211 and the panel member 213 are prevented from coming into contact with moisture even if moisture enters the hollow space 227. In addition, the frame rigidity can be further increased. Moreover, the outer peripheral edges of the base plate member 211 and the panel member 213 are entirely covered with the edge resin 235, so that the frame rigidity is further increased and the outer peripheral edges can be protected from, for example, corrosion. Although the base plate member 211 is composed of a steel material in this configuration, the occurrence of, for example, rust can be prevented by covering the base plate member 211 with the edge resin 235.

With regard to the rivets 219 forming the separation distance $\delta$, the separation distance between the base plate member 211 and the panel member 213 can be freely and precisely adjusted by changing the size of the rivets 219 to be sued, as in the above description. Moreover, by adjusting the separation distance $\delta$ over the entire overlap sections 217 or by locally adjusting the separation distance $\delta$, uneven flow or resin can be prevented during injection-molding. As a result, a lack of flow of resin is avoided so that the occurrence of an injection-molding defect is prevented, whereby the joining strength between the base plate member 211 and the panel member 213 can be further increased.

The through-holes 214 and 243 in this configuration are not limited to the circular holes shown in the drawings, and may be holes with a freely-chosen shape, such as square holes or slotted holes. Furthermore, as an alternative to the cylindricals shape, the cross-sectional shape of each hole may be a shape with an increasing inner surface area or a shape having an inclined surface, such as a tapered shape or shape in which an intermediate section in the thickness direction protrudes inward. In that case, the joining strength between the inner wall surface of each hole and the resin further increases, so that the frame rigidity is further increased.

Because the base plate member 211 and the panel member 213 are not to come into contact with each other, electrolytic corrosion can be prevented from occurring even when dissimilarly metallic materials having electric potentials different from each other, such as steel and aluminum, are used. Thus, the options for the joining materials are broadened, thereby achieving a higher degree of design freedom. Moreover, aluminum, which is inexpensive, can be used, so that the composite frame member 300 can be reduced in cost and weight.

Another Example of Separation Means

The separation means that separates the base plate member 211 and the panel member 213 from each other so as to form the separation distance $\delta$ between the base plate member 211 and the panel member 213 is not limited to the rivets 219 described above and may be various types of fastening members provided separately from the base plate member 211 and the panel member 213, such as spacers fitted around rivets or washers fastened by bolts, as shown in FIGS. 14A and 14B. With this configuration, the desired separation distance $\delta$ can be formed readily and precisely. In the case where washers are used, it is preferable that the belts be inserted through the washers prior to insertion-molding.

Figure 20:
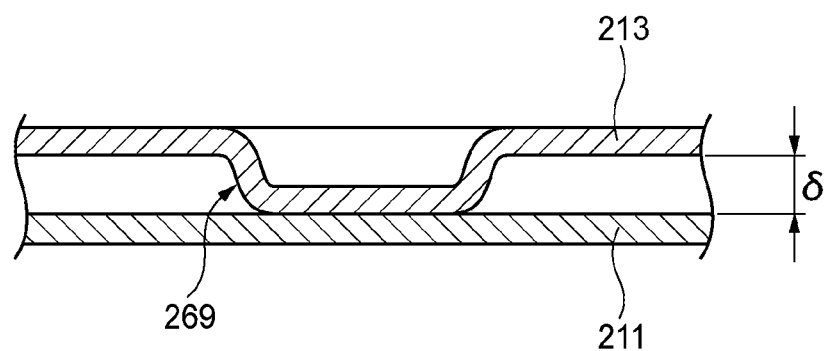
FIG. 20 is a cross-sectional view of a panel member and a base plate member in a case where the panel member is provided with a protrusion.

Furthermore, similar to the above-described case shown in FIG. 15, the separation distance $\delta$ can be formed without using listening members, such as the rivets 219, the spacers, or the washers. FIG. 20 illustrates a case where the panel member 213 has a protrusion 269 that is provided between the base plate member 211 and the panel member 213 and that protrudes toward the base plate member 211 from the panel member 213. Alternatively, the base plate member 211 may be provided with the protrusion. By giving the protrusion 269 a protruding height equivalent to the desired separation distance δ, the base plate member 211 and the panel member 213 can be readily adjusted to the desired separation distance δ.

Furthermore, by forming the protrusion 269 simultaneously with press-forming of the base plate member 211 or the panel member 213, the manufacturing process is prevented from becoming complicated. Moreover, since it is not necessary to use an additional component, the base plate member 211 and the panel member 213 can be separated from each other by the desired separation distance δ at low cost. Other features of the protrusion 269, such as surface treatment, position, and shape, are the same as those of the above-described protrusion 70 in FIG. 15.

Second Configuration Example of Composite Frame Member

Figure 21:
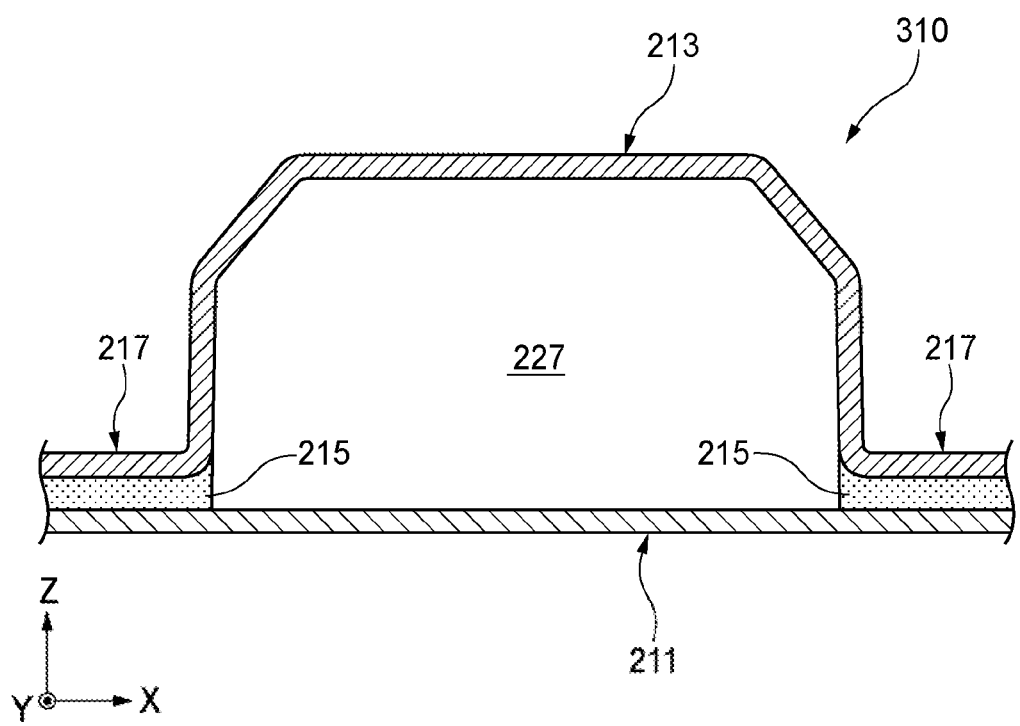
FIG. 21 is a schematic cross-sectional view of a second configuration example of a composite frame member.

Next, a second configuration example of a composite frame member will be described. FIG. 21 is a schematic cross-sectional view of the second configuration example of a composite frame member 310.

In the composite frame member 310, the intermediate 215 is provided only in the overlap sections 217 between the base plate member 211 and the panel member 213. In this case, through-holes (not shown) are formed only in the overlap sections 217 between the base plate member 211 and the panel member 213. Other configurations are the same as those in the first configuration example of the composite frame member described above.

According to this configuration, the composite frame member 310 has a minimal simple structure so that the material costs can be reduced. In addition, the base plate member 211 and the panel member 213 can be securely joined at the overlap sections 217, so that the frame rigidity is increased. Moreover, gaps that allow moisture to enter, which may cause corrosion and electrolytic corrosion, are prevented from being formed between the base plate member 211 and the intermediate resin 215 as well as between the panel member 213 and the intermediate resin 215.

Third Configuration Example of Composite Frame Member

Figure 22:
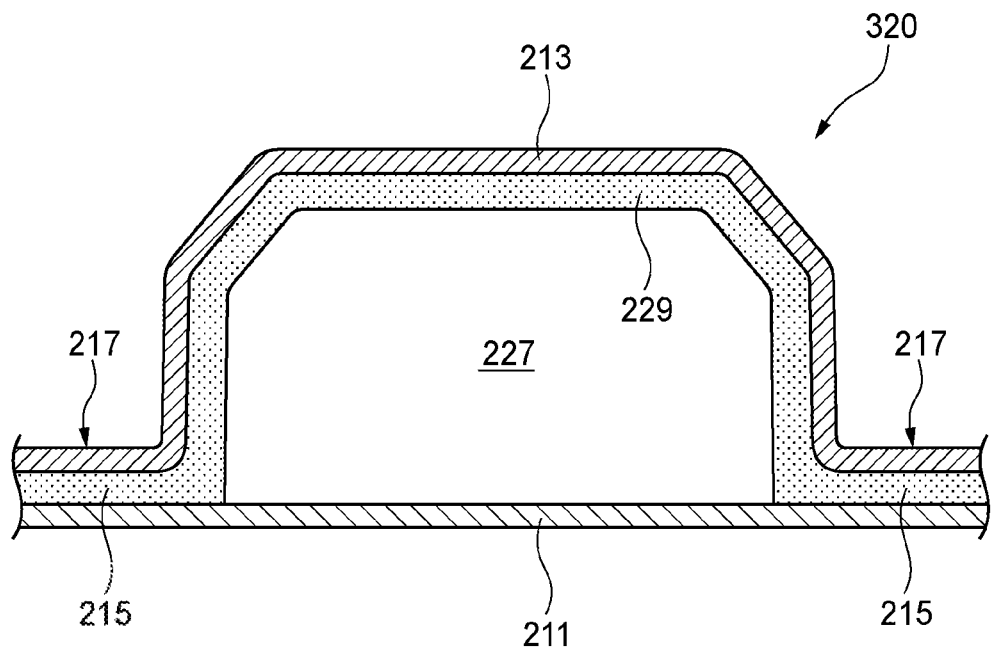
FIG. 22 is a schematic cross-member view of a third configuration example of a composite frame member.

Next, a third configuration example of a composite frame member will be described. FIG. 22 is a schematic cross-sectional view of the third configuration example of the composite frame member.

In a composite frame member 320, the intermediate resin 215 is provided in the overlap sections 217, and the inner resin 229 is provided on the inner surface at the hollow space 227 side of the panel member 213. In this case, through-holes (not shown) are formed in the base plate member 211 in the overlap sections 217 and in the panel member 213, and the resin joining strength is increased at the respective sites. Other configurations are the same as those of the composite frame member 310 according to the second configuration example described above.

According to this configuration, the composite frame member 320 has a simple structure so that the material costs can be reduced. Moreover, because the inner resin 229 is provided on the inner surface at the hollow space 227 side of the panel member 213, the frame rigidity of the composite frame member 320 is increased, thereby achieving increased durability.

Fourth Configuration Example of Composite Frame Member

Figure 23:
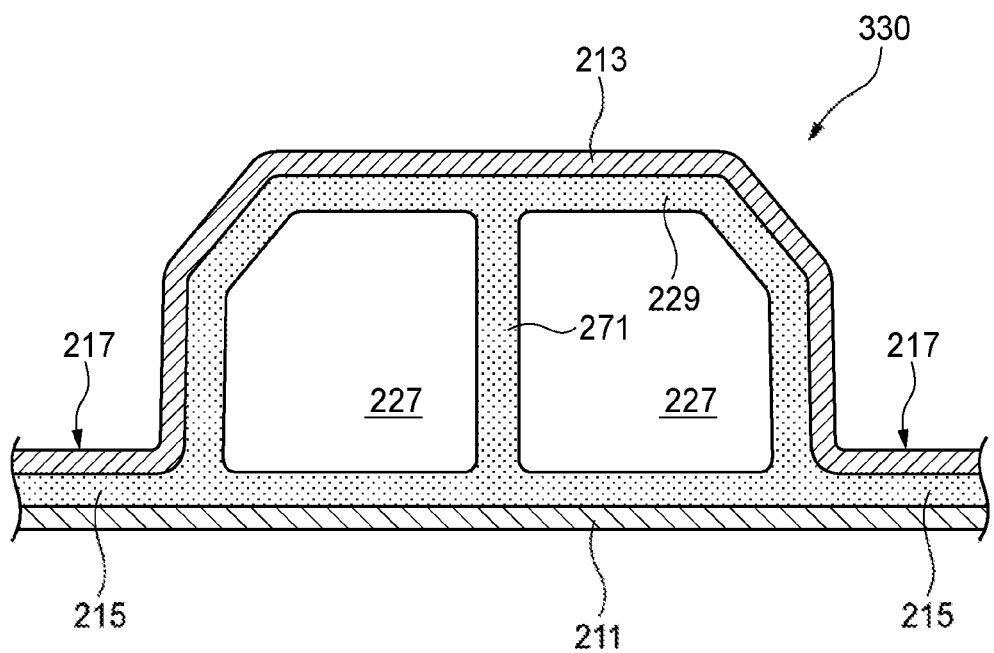
FIG. 23 is a schematic cross-sectional view of a fourth configuration example of a composite frame member.

Next, a fourth configuration example of a composite frame member will be described. FIG. 23 is a schematic cross-sectional view of the fourth configuration example of the composite frame member.

In a composite frame member 330, resin is also provided on the base plate member 211 in the composite frame member 320 according to the third configuration example described above, so that the inner resin 229 is formed within the entire hollow space 227. Furthermore, a wall 271 that connects between the top of the inner resin 229 formed along the top surface of the panel member 213 and the base of the inner resin 229 formed along the base plate member 211 is provided. The wall 271 extends in the longitudinal direction of the composite frame member 330 and constitutes a rib serving as a reinforcement section. Other configurations are the same as those of the composite frame member 320 according to the third configuration example described above.

Although the wall 271 shown in the drawing is provided at a single location in the central area in the frame width direction (i.e., X direction), the frame rigidity can be further increased by providing walls at a plurality of locations. Moreover, a wall that connects to the inner resin 229 in the frame width direction (i.e., X direction) may be provided in place of the wall 271 or in addition to the wall 271. In that case, the frame strength can be increased in a plurality of directions.

Figure 24A:
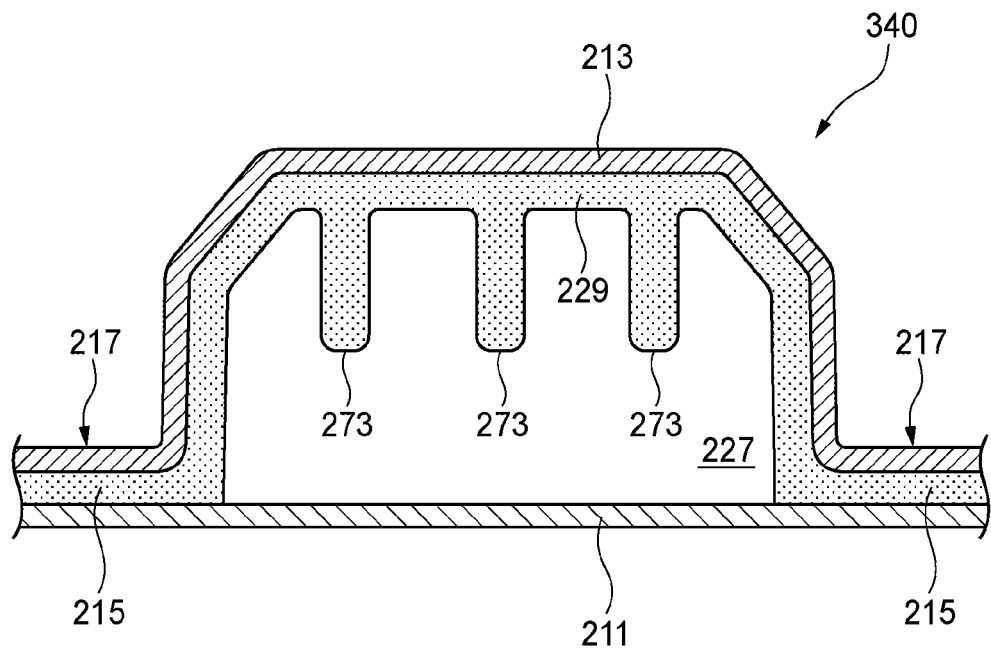
FIG. 24A is a schematic cross-sectional view illustrating a composite frame member provided with ribs.

As a rib shape of the composite frame member 330, various shapes may be employed. For example, as shown in FIG. 24A, in a composite frame member 340, a plurality of walls 273 serving as ribs may protrude toward the base plate member 211 from the inner resin 229 extending along the top of the panel member 213. The rigidity of the composite frame member 330 can still be increased even though the walls 273 do not connect to the base plate member 211.

Figure 24B:
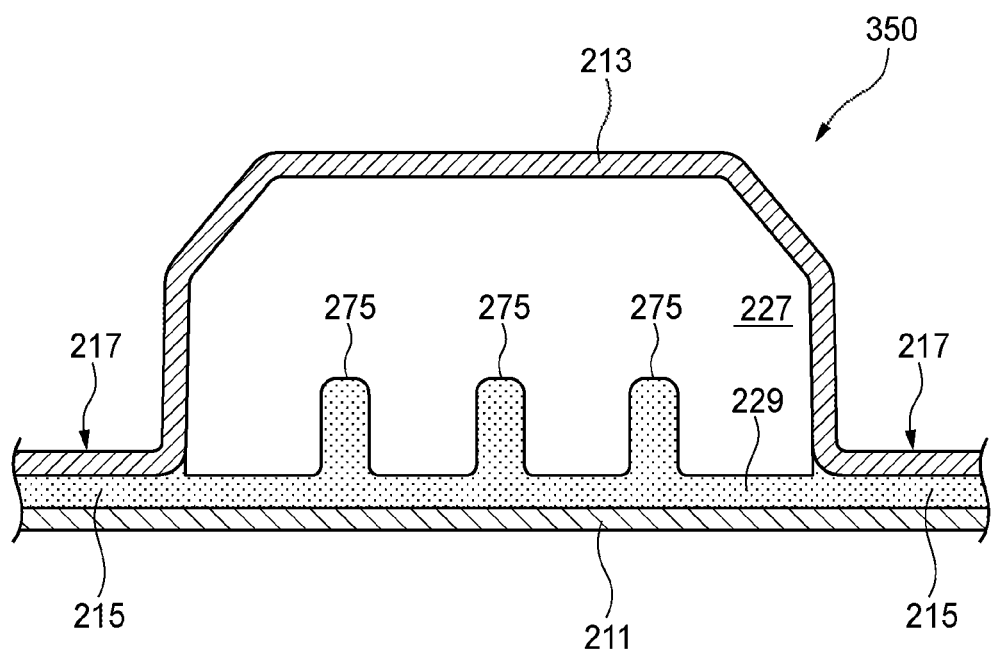
FIG. 24B is a schematic cross-sectional view illustrating a composite frame member provided with ribs.

As shown in FIG. 24B, in a composite frame member 350, a plurality of walls 275 serving as ribs may stand upright from the inner resin 229 extending along the base plate member 211.

Fifth Configuration Example of Composite Frame Member

Figure 25:
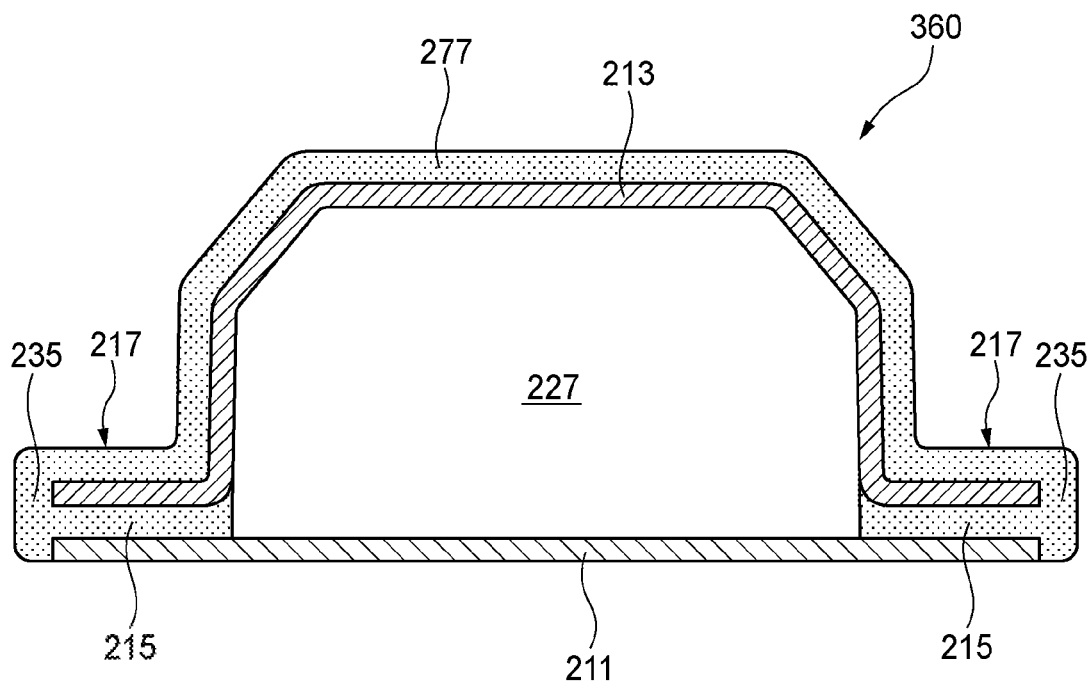
FIG. 25 is a schematic cross-sectional view of a fifth configuration example of a composite frame member.

Next, a fifth configuration example of a composite frame member will be described. FIG. 25 is a schematic cross-sectional view of the fifth configuration example of the composite frame member.

In the composite frame member 360, the outer surface, opposite from the hollow space 227, of the panel member 213 in the composite frame member 310 according to the second configuration example described above is provided with outer resin 277. Specifically, a part that forms the exterior of the closed cross-sectional shape defined by the base plate member 211, the panel member 213, and the intermediate resin 215 is covered with resin.

Furthermore, the outer resin 277 is connected to the edge resin 235, which covers the edges of the base plate member 211 and the panel member 213, and also to the intermediate resin 215 at the overlap sections 217. The outer resin 277, the edge resin 235, and the intermediate resin 215 are integrally molded by injection-molding. Other configurations are the same as those of the composite frame member 320 according to the second configuration example described above.

According to this configuration, the outer resin 277 and the edge resin 235 cover the outer side of the composite frame member 360 so that immersion of moisture from the outer side of the composite frame member 360 can be prevented. By covering the outer side of the composite frame member 360 with resin, the rigidity and the durability of the frame are increased.

Sixth Configuration Example of Composite Frame Member

Figure 26:
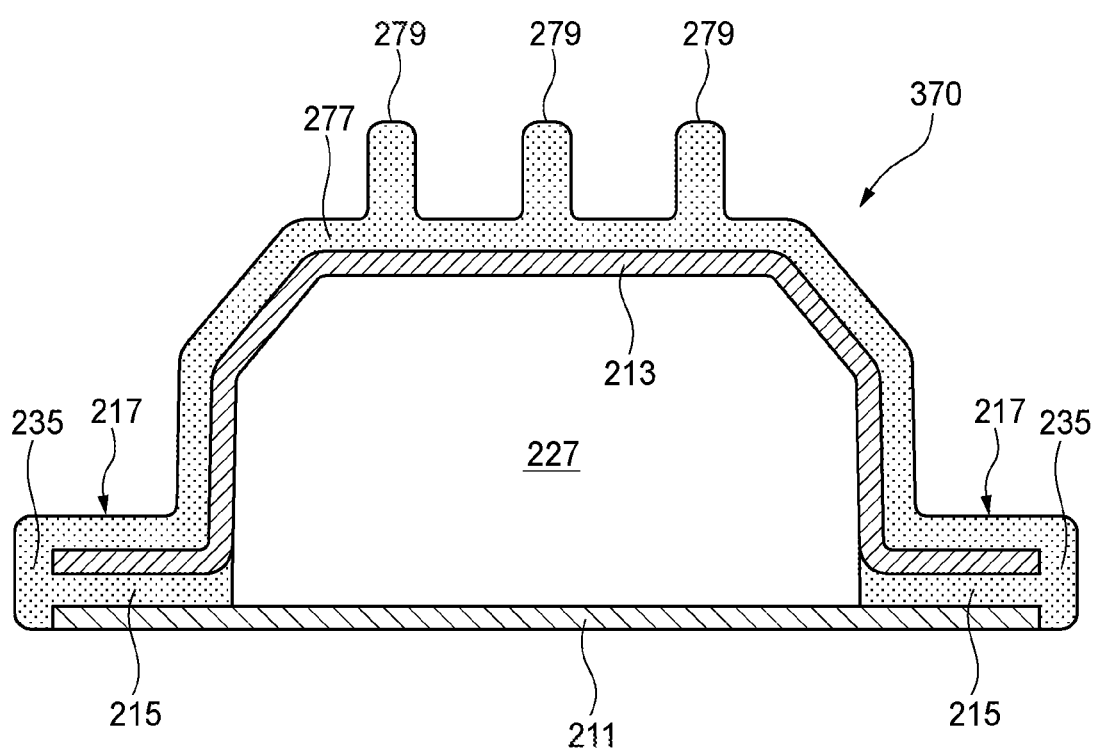
FIG. 26 is a schematic cross-sectional view of a sixth configuration example of a composite frame member.

Next, a sixth configuration example of a composite frame member will be described. FIG. 26 is a schematic cross-sectional view of the sixth configuration example of the composite frame member.

A composite frame member 370 has a plurality of walls 279 standing upright outward from the outer resin 277 of the compose frame member 330 according to the fifth configuration example described above. The plurality of walls 279 constitute ribs serving as reinforcement sections. Other configurations are the same as those of the composite frame member 360 according to the fifth configuration example described above.

According to this configuration, because ribs are formed on the outer resin 277 of the composite frame member 370, the strength is significantly increased due to an increase in moment of inertia of area, so that the frame rigidity can be efficiently increased.

Seventh Configuration Example of Composite Frame Member

Figure 27:
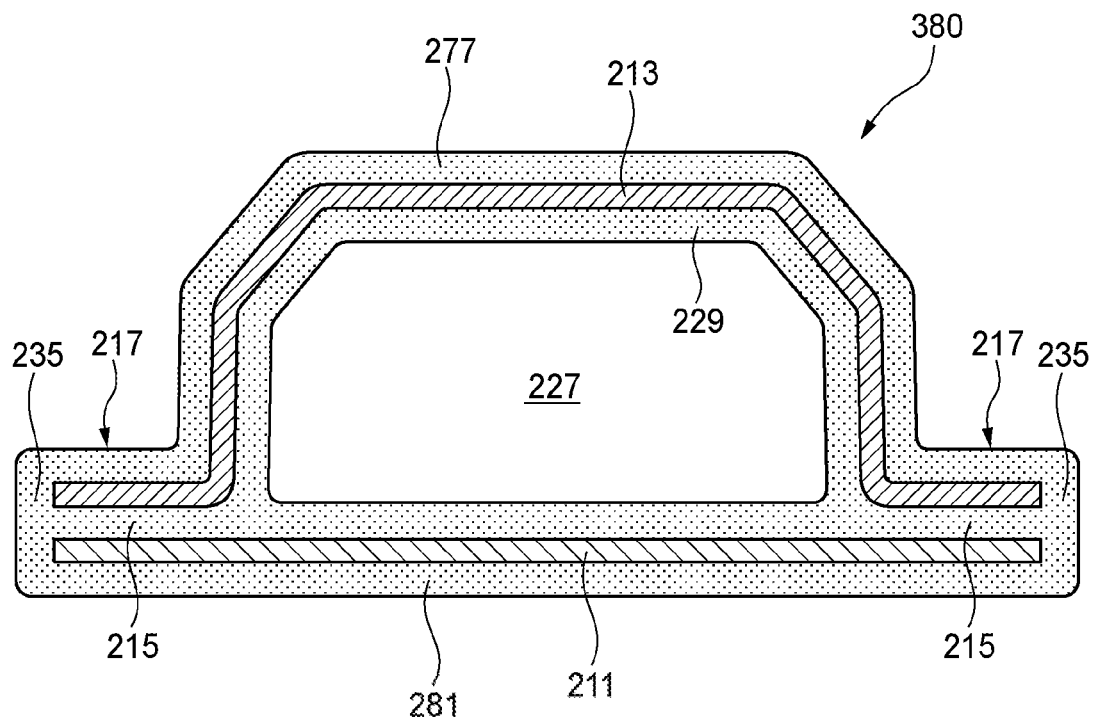
FIG. 27 a schematic cross-sectional view of a seventh configuration example of a composite frame member.

Next, a seventh configuration example of a composite frame member will be described. FIG. 27 is a schematic cross-sectional view of the seventh configuration example of the composite frame member.

A composite frame member 380 is provided with inner resin 229 on the inner peripheral surface at the hollow space 227 side of the panel member 213 and the base plate member 211 in the composite frame member 360 according to the fifth configuration example described above. Furthermore, base resin 281 is formed at the opposite side from the bellow space 227 side of the base plate member 211. The outer resin 277, the edge resin 235, the intermediate resin 215, and the base resin 281 are integrally molded by injection-molding. Other configurations are the same as those of the composite frame member according to the fifth configuration example described above.

According to this configuration, in the cross section orthogonal to the longitudinal direction of the composite frame member 380, the base plate member 211 and the panel member 213 are covered with the resin 215, the resin 229, the resin 235, the resin 277, and the resin 281 around the entire circumference. Therefore, the base plate member 211 and the panel member 213 have no exposed sections, thereby reliably preventing, for example, corrosion from occurring. Moreover, the total thickness of the resin is increased, so that the frame rigidity is further increased.

Figure 28A:
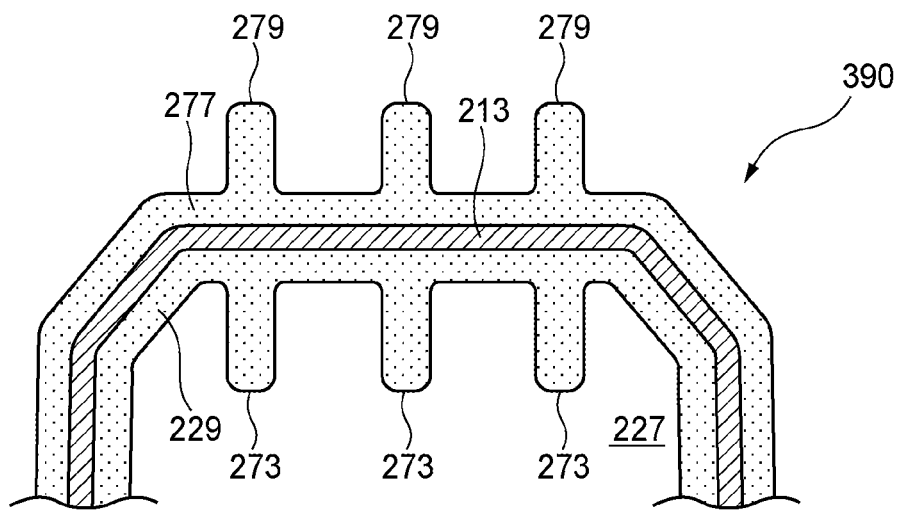
FIG. 28A is a partial cross-sectional view of a composite frame member provided with ribs.

Furthermore, similar to the above description, the composite frame member having this configuration may also be provided with a rib or ribs. For example, as shown in FIG. 28A, in a composite frame member 390, the outer resin 277 extending along the panel member 213 may partially be provided with a plurality of walls 279, and the inner resin 229 extending along the panel member 213 may partially be provided with a plurality of walls 273. Moreover, a configuration provided with either of the walls 279 and 273 is also permissible. In the above-described case, the frame configuration can be further improved, and a high-strength composite frame member 390 can be built.

Figure 28B:
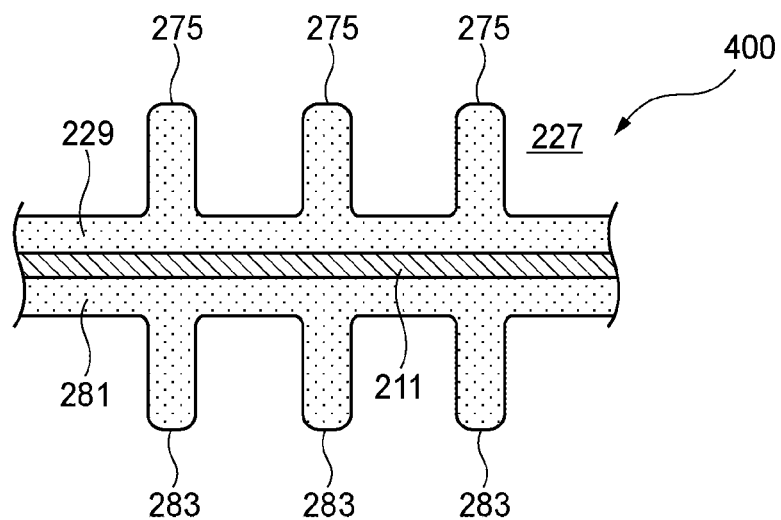
FIG. 28B is a partial cross-sectional view of a composite frame member provided with ribs.

Furthermore, as shown in FIG. 28B, in a composite frame member 400, the inner resin 229 extending along the base plate member 211 may partially be provided with a plurality of walls 275, and the base resin 281 extending along the base plate member 211 may partially be provided with a plurality of walls 283. Alternatively, the composite frame ember 400 may be provided with either of the walls 275 and 283.

Eighth Configuration Example of Composite Frame Member

Figure 29:
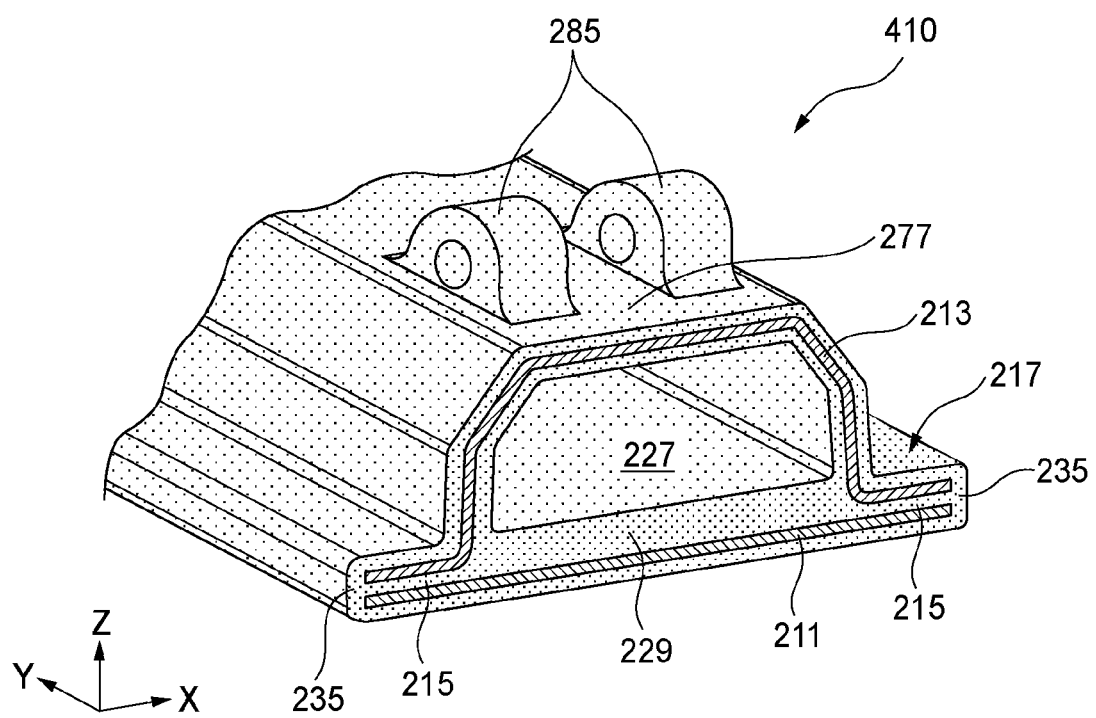
FIG. 29 is a schematic cross-sectional view of an eighth configuration example of a composite frame member.

Next, an eighth configuration example of a composite frame member will be described. FIG. 29 is a schematic cross-sectional view of the eighth configuration example of the composite frame member.

In a composite frame member 410, a part of the outer resin 277 in the composite frame member 380 according to the seventh configuration example described above is integrally provided with a rib-shaped attachment section 285 that protrudes outward from the resin surface. The rib-shaped attachment section 285 is provided with attachment holes 287 so that the composite frame member 410 is readily attachable to another component. In addition, because the outer resin 277 is reinforced with the rib-shaped attachment section 285, the rib-shaped attachment section 285 serves as a reinforcement section so that the rigidity of the composite frame member 410 can be increased.

Ninth Configuration Example of Composite Frame Member

Figure 30:
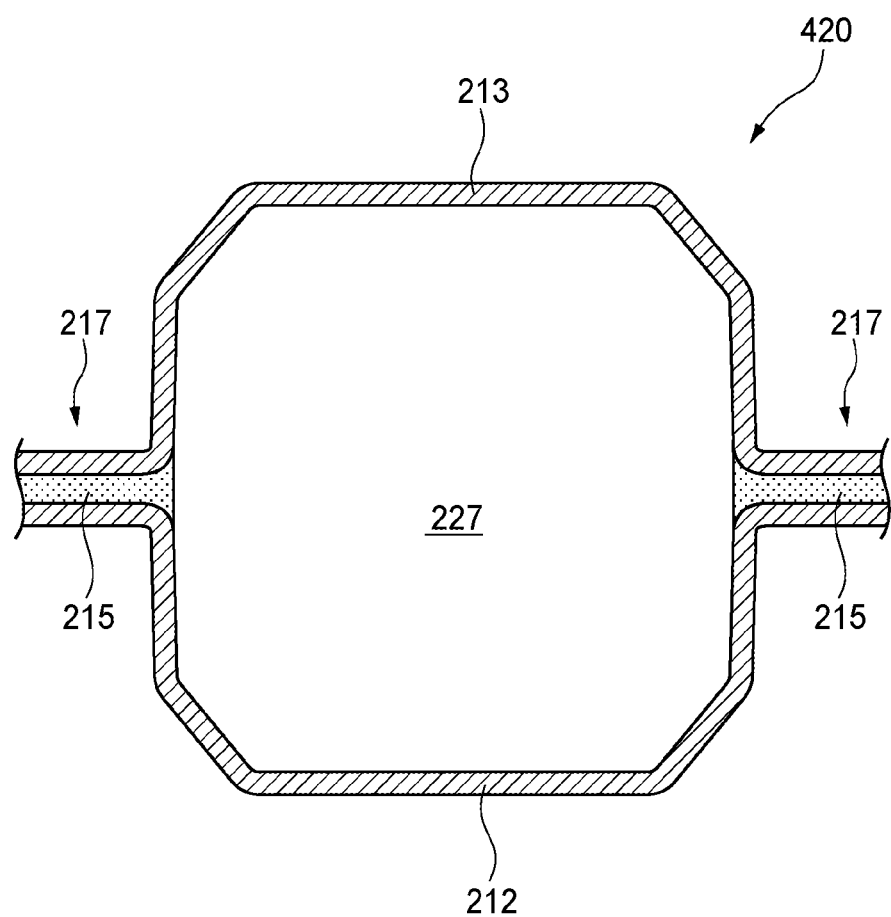
FIG. 30 is a schematic cross-sectional view of a ninth configuration example of a composite frame member.

Next, a ninth configuration example of a composite frame member will be described. FIG. 30 is a schematic cross-sectional view of the ninth configuration example of the composite frame member.

In a composite frame member 420, a base plate member 212 having a bulging section similar to the panel member 213 is used in place of the base plate member 211 in the composite frame member 310 according to the first configuration example described above. Other configurations are the same as those of the composite frame member 310 according to the first configuration example.

According to this configuration, the base plate member 212 having the bulging section is used so that the frame rigidity is increased due to an increase in moment of inertia of area. Moreover, similar to the third to eighth configuration examples of composite frame members described above, resin is provided on sections of the base plate member 212 and the panel member 213, so that the above-described advantages are achieved while the frame rigidity is further increased.

Although each of the above-described configurations relates to a laminated structure constituted of two members, namely the base plate member and the panel member, a multilayer structure having an additional strength member further laminated thereon is also permissible.

The present invention described above is not limited to the above embodiments. The configurations of the embodiments may be mutually combined or may be modified or altered by a person skilled in the art based on the description and known technology. Such combination, modification, and alteration are anticipated in the present invention and are to be included in the scope to be protected. For example, as the step for injecting the resin, a method of pressure-injecting the resin may be employed as an alternative to the molding step of performing injection-molding.

Additional Items

The following items are disclosed in this description.

(1) In a joining structure including a first member and a second member that are joined to each other and at least one of which is composed of a metallic material, the first member and the second member are disposed with a gap therebetween, at least a part of the gap is filled with resin, and the first member and the second member are joined together via the resin.

(2) In the joining structure according to additional item (1), a surface of at least one of the first member and the second member opposite from a surface where the first member and the second member face each other is covered with the resin.

(3) In the joining structure according to additional item (2), a part of the formed resin protrudes outward so as to serve as a reinforcement section.

(4) In the joining structure according to any one of additional items (1) to (3), at least one of the first member and the second member has at least one through-hole filled with the resin.

(5) In the joining structure according to any one of additional items (1) to (4), the gap is formed by a gap forming member (separation means) disposed between the first member and the second member.

(6) In the joining structure according to any one of additional items (1) to (4), the gap is formed by a protrusion that is provided in at least one of the first member and the second member and that protrudes from one of the first member and the second member to the other member.

(7) In the joining structure according to any one of the additional items (1) to (6), the first member and the second member are composed of materials having electric potentials different from each other.

(8) In a composite frame member including a first member and the second member that extend in a longitudinal direction and at least one of which is composed of a metallic material, the first member and the second member have overlap sections disposed in an overlapping manner with a gap therebetween, and at least a part of the gap is filled with resin such that at least a part of the overlap sections has a substantially closed cross-sectional shape, and wherein the first member and the second member are joined together via the resin.

(9) In the composite frame member according to additional item (8), a part of at least on of the first member and the second member that forms at least one of an interior and an exterior of the substantially closed cross-sectional shape is covered with resin.

(10) In the composite frame member according to additional item (9), a part of the resin covering at least one of the interior and the exterior of the substantially closed cross-sectional shape protrudes outward so as to serve as a reinforcement section.

(11) In the composite frame member according to any one of additional items (8) to (10), at least one of the first member and the second member has a through-hole filled with the resin.

(12) In the composite frame member according to any one of the additional items (8) to (11), the gap is formed by a gap forming member (separation means) disposed between the first member and the second member.

(13) In the composite frame member according to any one of the additional items (8) to (11), the gap is formed by a protrusion that is provided in at least one of the first member and the second member and that protrudes from one of the first member and the second member to the other member.

(14) In the composite frame member according to any one of the additional items (8) to (13), the first member and the second member are composed of materials having electric potentials different from each other.

The present application is based on Japanese Patent Application (No. 2015-22474) filed Feb. 6, 2015, Japanese Patent Application (No. 2015-22475) filed on Feb. 6, 2015, and Japanese Patent Application (No. 2015-205912) filed on Oct. 19, 2015, the contents of which are hereby incorporated by reference.

REFERENCE SIGNS LIST 13 resin section
13c intermediate resin
13in inner resin
13out outer resin
15, 17, 19 wall (reinforcement section)
21 first member
23 first panel member
25 first base plate member
29, 39 through-hole
31 second member
33 second panel member
33d, 35b, 70 protrusion (separation means)
35 second base plate member
45 coupling section (reinforcement section)
51 rivet (separation means)
61 spacer (separation means)
83 washer (separation means)
100, 110, 120, 130, 140 joining structure
211, 212 base plate member (first member)
213 panel member (second member)
215 intermediate resin
217 overlap section
219 rivet (separation means)
223 flange
229 inner resin
235 edge resin
241, 243 through-hole
269 protrusion
271, 273, 275, 279 wall (reinforcement section)
277 outer resin
281 base resin
285 rib-shaped attachment section (reinforcement section)
300, 310, 320, 330, 340, 350, 360, 370, 380, 390, 400, 410 composite frame member (joining structure)
W overlapping region
δ separation distance

The invention claimed is:
1. A joining structure comprising:
a first member extending in a longitudinal direction comprising a first material and having a joining surface and an opposing surface;
a second member extending in the longitudinal direction comprising a second material, wherein the first material is a metallic material and the second material is a nonmetallic material or a dissimilar metallic material, and having a joining surface and an opposing surface, wherein the first member and the second member are disposed in an at least partially overlapping manner in the longitudinal direction defining an overlap section, the overlap section forming a hollow space-containing closed cross-sectional shape orthogonal to the longitudinal direction;

a rivet welded to the first member and providing a separation between the joining surface of the first member and the joining surface of the second member; and an integrally-formed resin section including a portion, covering the opposing surface of the first member, an intermediate portion located within the separation between the joining surface of the first member and the joining surface of the second member, and a portion covering the opposing surface of the second member.

2. The joining structure of claim 1, wherein the rivet is clinched to the second member.

3. The joining structure of claim 2, wherein the rivet comprises a head and shank, wherein the head is clinched to the second member and the shank at least partially defines the separation between the joining surface of the first member and the joining surface of the second member.

4. The joining structure of claim 3, wherein the rivet head is covered by the resin section.

5. The joining structure of claim 1, wherein the first member and or the second member includes a through-hole extending between the opposing surface and the joining surface, wherein resin filling the through-hole connects the intermediate portion to the portion covering the opposing surface of the first member and/or the portion covering the opposing surface of the second member.

6. The joining structure of claim 1, wherein the resin section further includes a reinforcement section protruding from a surface of the portion covering the opposing surface of the first member, the intermediate portion, or the portion covering the opposing surface of the second member.

7. The joining structure of claim 1, wherein the second member is a base plate and the first member is a profiled member.

8. The joining structure of claim 7, wherein the resin section further includes a reinforcement section protruding from a surface of the portion covering the opposing surface of the first member, the intermediate portion, and/or the portion covering the opposing surface of the second member.

9. The joining structure of claim 8, wherein the reinforcement section protruding from a surface of the portion covering the opposing surface of the first member is a plurality of ribs or a coupling section.

10. The joining structure of claim 8, wherein intermediate portion at least partially defines the hollow space of the closed cross-sectional shape, wherein the reinforcement section protruding from a surface of the intermediate portion forms ribs extending partially into the hollow space or walls traversing the hollow space.

11. The joining structure of claim 8, wherein the reinforcement section protruding from a surface of the portion covering the opposing surface of the second member is a plurality of ribs.

12. The joining structure of claim 1, wherein the second member is a base plate or a profiled member and the first member comprises the hollow space-containing closed cross-sectional shape.

13. The joining structure of claim 12, wherein the resin section further includes a reinforcement section protruding from a surface of the portion covering the opposing surface of the first member and/or the portion covering the opposing surface of the second member.

14. The joining structure of claim 12, wherein the portion covering the opposing surface of the first member at least partially defines the hollow space of the closed cross-sectional shape, wherein the reinforcement section protruding from a surface of the intermediate portion forms ribs extending partially into the hollow space or walls traversing the hollow space.

15. The joining structure of claim 1, wherein the nonmetallic material is a reinforced plastic composite material.

16. The joining structure of claim 1, wherein the dissimilar metallic material comprises a different electric potential from the metallic material.

17. The joining structure of claim 1, wherein the first material and second material are one of steel and aluminum.

18. The joining structure of claim 1, wherein the integrally-formed resin section is formed by injection molding.

\* \* \* \* \*